(12) United States Patent
Kneckt et al.

(10) Patent No.: US 10,244,473 B2
(45) Date of Patent: Mar. 26, 2019

(54) APPARATUS, METHOD, AND COMPUTER PROGRAM PRODUCT PROVIDING IMPROVED POWER MANAGEMENT IN WIRELESS NETWORKS

(75) Inventors: Jarkko Kneckt, Espoo (FI); Janne Marin, Espoo (FI); Mika Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1986 days.

(21) Appl. No.: 12/287,644

(22) Filed: Oct. 10, 2008

(65) Prior Publication Data
US 2009/0097428 A1    Apr. 16, 2009

(51) Int. Cl.
*H04W 52/02* (2009.01)
*H04W 84/12* (2009.01)

(52) U.S. Cl.
CPC ........ *H04W 52/0216* (2013.01); *H04W 84/12* (2013.01); *Y02D 70/00* (2018.01); *Y02D 70/142* (2018.01); *Y02D 70/144* (2018.01); *Y02D 70/146* (2018.01); *Y02D 70/22* (2018.01)

(58) Field of Classification Search
CPC .. H04W 52/0216; H04W 84/12; Y02D 70/00; Y02D 70/22
USPC .......................................... 370/311, 312, 313
See application file for complete search history.

(56) References Cited

U.S. PATENT DOCUMENTS

| | | | | |
|---|---|---|---|---|
| 6,665,520 B2* | 12/2003 | Romans | ....................... | 455/13.4 |
| 7,203,526 B2* | 4/2007 | Frank | ............................. | 455/574 |
| 7,224,704 B2* | 5/2007 | Lu et al. | ....................... | 370/476 |
| 7,257,723 B2* | 8/2007 | Galles | ........................... | 713/321 |
| 7,424,007 B2* | 9/2008 | Meier et al. | .................. | 370/352 |
| 7,702,352 B2* | 4/2010 | Conner et al. | ................. | 455/522 |
| 7,912,943 B2* | 3/2011 | Maki | ............................. | 709/224 |
| 2003/0137993 A1* | 7/2003 | Odman | ........................ | 370/468 |
| 2005/0136913 A1 | 6/2005 | Kampen et al. | ........... | 455/426.2 |
| 2005/0213405 A1* | 9/2005 | Stopler | ......................... | 365/203 |
| 2005/0272380 A1 | 12/2005 | Stacey | ............................ | 455/70 |
| 2006/0251004 A1 | 11/2006 | Zhong et al. | .................. | 370/318 |
| 2006/0258322 A1 | 11/2006 | Conner et al. | ............. | 455/343.1 |

(Continued)

FOREIGN PATENT DOCUMENTS

WO    WO 03/049301 A2    6/2003
WO    WO-2007/092644 A2    8/2007

OTHER PUBLICATIONS

"Optimal ATIM size for 802.11 networks in ad hoc mode", X Gao et al., DoCoMo Communications Lab USA (2006), 3 pgs.

(Continued)

*Primary Examiner* — Mohammad S Anwar
(74) *Attorney, Agent, or Firm* — Harrington & Smith

(57) ABSTRACT

There are a plurality of power saving modes for a device in a wireless network. It is determined that the device is using one of the power saving modes on a peer-specific link, a state is set to indicate that the device is using that specific power saving mode, and a message is transmitted to the peer over the link that includes an indication of the state. There may also be a power management indication that indicates whether a full power state is in use of one of the power saving modes are in use. Exemplary power saving modes are light sleep and deep sleep. A method, apparatus, and computer readable medium are detailed, and exemplary environments may be practices in or by a WLAN mesh point.

41 Claims, 12 Drawing Sheets

(56) References Cited

U.S. PATENT DOCUMENTS

2007/0104145 A1* 5/2007 Jan .............................. 370/331
2007/0133448 A1 6/2007 Gao et al. .................... 370/311

OTHER PUBLICATIONS

"IEEE P802.11s™/D1.07, Draft Standard for Information Technology—Telecommunications and information exchange between systems—Local and metropolitan area networks—Specific requirements—Part 11: Wireless LAN Medium Access Control (MAC) and Physical Layer (PHY) specifications: ESS Mesh Networking", (Sep. 2007), 241 pgs.

"IEEE 802.11 g™, IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 4: Further Higher Data Rate Extension in the 2.4 GHZ Band", (Jun. 2003), 78 pgs.

* cited by examiner

"AD HOC" 1-HOP NETWORKING MODEL

THE SOURCE AND THE DESTINATION OF THE MSDUs
IS WITHIN 1-HOP NEIGHBORHOOD
NO FORWARDING, ROUTING OR LINK METRIC IS USED

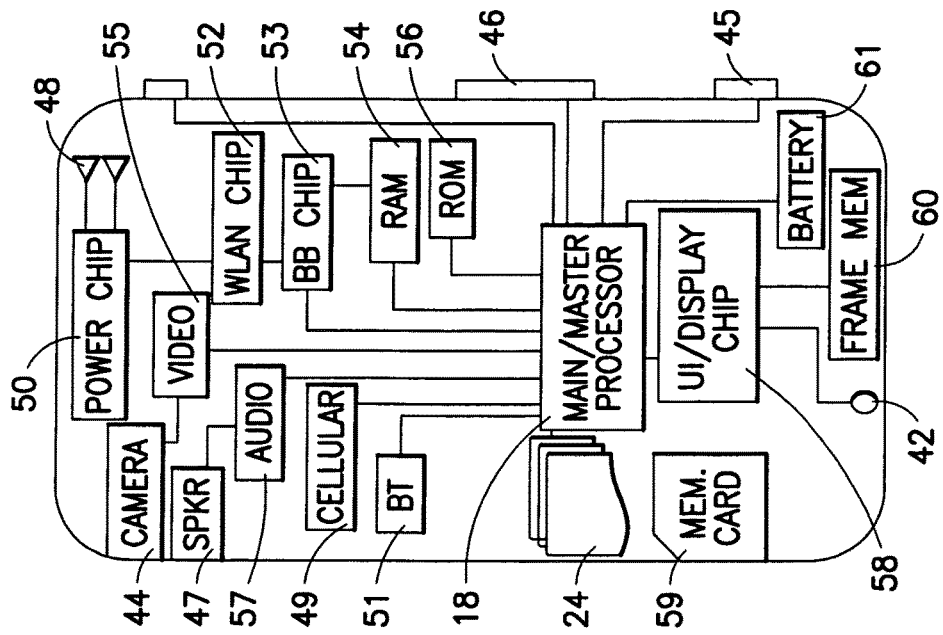
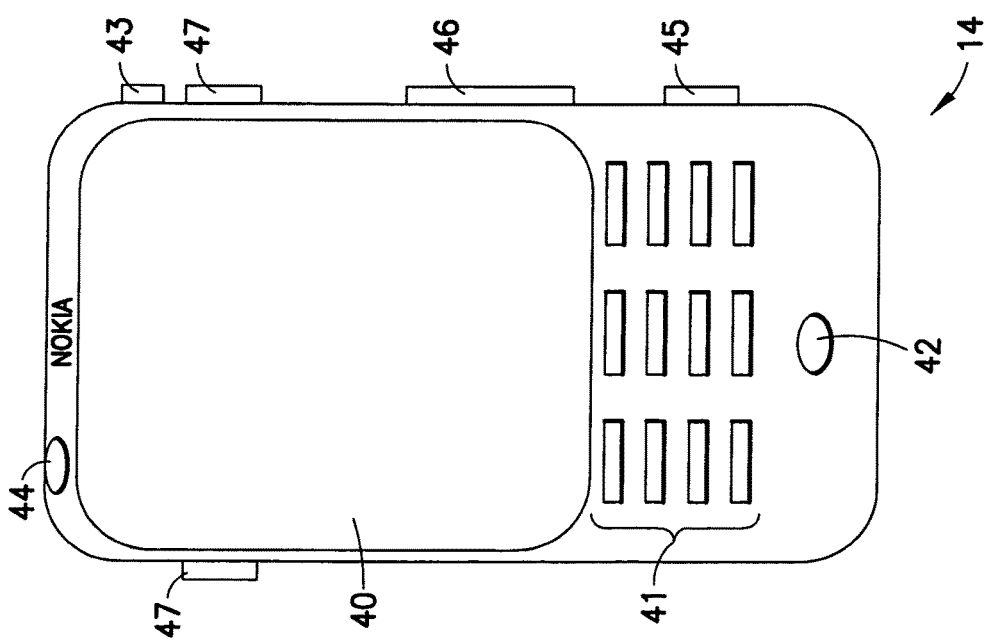
FIG.4B

```
┌─────────────────────────────────────────┐
│ TRANSMITTING, BY A FIRST DEVICE IN A WIRELESS │
│ NETWORK, A BROADCAST OR MULTICAST MESSAGE     │
│ COMPRISING AN INDICATION OF BUFFERED          │─ 121
│ TRAFFIC FOR A SECOND DEVICE IN THE WIRELESS   │
│ LOCAL AREA NETWORK                            │
└─────────────────────────────────────────┘
                     │
                     ▼
┌─────────────────────────────────────────┐
│ IN RESPONSE TO RECEIVING A TRIGGER FRAME │
│ FROM THE SECOND DEVICE, THE FIRST DEVICE │─ 122
│ SUBSTANTIALLY IMMEDIATELY INITIATING A   │
│ SERVICE PERIOD FOR COMMUNICATION WITH THE│
│ SECOND DEVICE                            │
└─────────────────────────────────────────┘
```

FIG. 12

```
┌─────────────────────────────────────────┐
│ TRANSMITTING, BY A FIRST DEVICE IN A WIRELESS │
│ NETWORK, A BROADCAST OR MULTICAST MESSAGE     │
│ COMPRISING AN INDICATION OF BUFFERED          │
│ TRAFFIC FOR A SECOND DEVICE IN THE WIRELESS   │─ 131
│ NETWORK, WHEREIN THE FIRST DEVICE IS          │
│ OPERABLE TO RECEIVE TRAFFIC UNTIL A           │
│ SUCCESSIVE BROADCAST OR MULTICAST             │
│ TRANSMISSION BY THE FIRST DEVICE              │
└─────────────────────────────────────────┘
                     │
                     ▼
┌─────────────────────────────────────────┐
│ IN RESPONSE TO RECEIVING A TRIGGER FRAME │
│ FROM ANOTHER DEVICE, THE FIRST DEVICE    │─ 132
│ INITIATING A SERVICE PERIOD FOR          │
│ COMMUNICATION WITH THE OTHER DEVICE      │
└─────────────────────────────────────────┘
```

FIG. 13

TRANSMITTING, BY A FIRST DEVICE IN A WIRELESS NETWORK, A BROADCAST OR MULTICAST MESSAGE COMPRISING AN INDICATION OF BUFFERED TRAFFIC FOR A SECOND DEVICE IN THE WIRELESS NETWORK, WHEREIN THE BROADCAST OR MULTICAST MESSAGE FURTHER COMPRISES AN INDICATION OF A CURRENT OPERATIONAL MODE OF A PLURALITY OF OPERATIONAL MODES FOR THE FIRST DEVICE, WHEREIN THE PLURALITY OF OPERATIONAL MODES INCLUDE A FIRST MODE WHEREIN IN RESPONSE TO RECEIVING A TRIGGER FRAME FROM THE SECOND DEVICE, THE FIRST DEVICE SUBSTANTIALLY IMMEDIATELY INITIATES A SERVICE PERIOD WITH ONLY THE SECOND DEVICE, WHEREIN THE PLURALITY OF OPERATIONAL MODES INCLUDE A SECOND MODE WHEREIN THE FIRST DEVICE STAYS ACTIVE UNTIL A SUCCESSIVE BROADCAST OR MULTICAST TRANSMISSION AND A RECEIVED FRAME FROM ANOTHER DEVICE COMPRISES A TRIGGER FRAME ⟵ 141

IN RESPONSE TO RECEIVING A TRIGGER FRAME IN ACCORDANCE WITH THE CURRENT MODE, THE FIRST DEVICE INITIATING A SERVICE PERIOD FOR COMMUNICATION WITH ANOTHER DEVICE ⟵ 142

FIG. 14

APPARATUS, METHOD, AND COMPUTER PROGRAM PRODUCT PROVIDING IMPROVED POWER MANAGEMENT IN WIRELESS NETWORKS

CROSS-REFERENCE TO RELATED APPLICATION

This application claims priority under 35 USC 119(e) to U.S. Provisional Patent Application Ser. No. 60/998,462 (filed Oct. 10, 2007), the contents of which are hereby incorporated by reference in their entirety.

TECHNICAL FIELD

The exemplary and non-limiting embodiments of this invention relate generally to wireless communication systems, methods, devices and computer program products and, more specifically, relate to power management techniques therefore.

BACKGROUND

The following abbreviations are utilized herein:
802.11s mesh networking described by the IEEE 802.11s draft amendment
ACK acknowledgement (acknowledgement message)
AP access point
ATIM announcement traffic indication message
DTIM delivery traffic indication message
DS distribution system
GAS generic advertisement service
IBSS independent basic service set
EEEE institute of electrical and electronics engineers
MAC medium access control (layer 2, L2)
MAP mesh access point
MIMO multiple input/multiple output
MP mesh point
MSDU MAC service data unit
STA station
TBTT target beacon transmission time
TIM traffic indication message
WiMAX worldwide interoperability for microwave access (IEEE 802.16 standard)
WLAN wireless local area network One publication of interest to the ensuing description is: IEEE P802.11s™/D1.07, Draft STANDARD for Information Technology-Telecommunications and information exchange between systems—Local and metropolitan area networks—Specific requirements—Part 11: Wireless LAN Medium Access Control (MAC) and Physical Layer (PHY) specifications: ESS Mesh Networking (September 2007).

In accordance with draft 1.07 of 802.11s, coordination of devices within radio range is achieved by the exchange of beacon frames. Periodic beacon transmission enables device discovery, supports dynamic network organization, and provides support for mobility.

As described in the IEEE P802.11s™ Draft Standard, in section 5.2.9.1 "Introduction to mesh", in WLAN deployments without mesh services, stations (STAs) must associate with an AP in order to gain access to the network. These STAs are dependent on the AP with which they are associated to communicate. An example of a non-mesh WLAN deployment model and device classes are illustrated herein in FIG. 1, which reproduces FIG. s1 of the IEEE P802.11s™ Draft Standard.

Many WLAN devices can benefit from support for more flexible wireless connectivity. Functionally, the Distribution System (e.g., the traditional backbone which over which the APs are connected) of an AP can be replaced with wireless links or multi-hop paths between multiple APs. Devices traditionally categorized as clients can benefit from the ability to establish peer-to-peer wireless links with neighboring clients and APs in a mesh network.

An example mesh is illustrated in FIG. 2, which reproduces FIG. s2 of the IEEE P802.11s™ Draft Standard. Mesh points (MPs) are entities that support mesh services, i.e., they participate in the formation and operation of the mesh network. An MP may be co-located with one or more other entities (e.g., AP, portal, etc.). The configuration of an MP that is co-located with an Access Point is referred to as a MAP. Such a configuration allows a single entity to logically provide both mesh functionalities and AP functionalities simultaneously. STAs associate with APs to gain access to the network. Only MPs participate in mesh functionalities such as path selection and forwarding, etc. Mesh portals (MPPs) interface the network to other IEEE 802 LAN segments.

As is stated in section 5.2.9.2, "Mesh network model", of the IEEE P802.11s™ Draft Standard, a mesh network is an IEEE 802 LAN comprised of IEEE 802.11 links and control elements to forward frames among the network members. Effectively, this means that a mesh network appears functionally equivalent to a broadcast Ethernet from the perspective of other networks and higher layer protocols. Thus, it normally appears as if all MPs in a mesh are directly connected to the link layer. This functionality is transparent to higher layer protocols. Reference in this regard can be made to FIG. 3A, which reproduces FIG. s-3 of the IEEE P802.11s™ Draft Standard. It should be noted that while this figure shows the forwarding of data over multiple hops, there may also be direct data transfer over a single hop, such as is shown in FIG. 3B, wherein the source and destination of the MSDUs are within a one-hop neighborhood, and where no forwarding, routing or link metric need be used.

An Awake Window is the time period after TBTT during which frame delivery initiation messages may be transmitted. An ATIM frame is used after beacon frame to initiate frame transmissions. An IBSS mode has beacons, similarly as infrastructure mode. IBSS beacon transmission and infrastructure beacon transmission rules differ. In infrastructure beaconing one AP transmits one beacon, in IBSS multiple stations compete for a beacon transmission opportunity, and a given station either receives a beacon from another station in the same IBSS network or transmits a beacon. Specifically, in the awake window only the beaconing mesh point operates in the active mode, whereas in the IBSS ATIM window all of the mesh points operate in the active mode. Reference in this regard may be had to IEEE 802.11-1999 reaff 2003, sections 11.1.2.1 and 11.1.2.2. 802.11s specifies that the Awake Window which is similar to the ATIM period is used after the infrastructure or IBSS beacon, if the MP operates in power save mode.

The packet sets the synchronization of the group and announces that messages are waiting to be delivered. Stations in power save mode wake up periodically to listen for ATIM packets in ad hoc (IBSS) networks, just as they do for Beacon packets in infrastructure (BSS or ESS) networks.

A power-consumption problem exists in the foregoing and other types of wireless networks that is related to a need to minimize the activity time of a MP, such as the periodic media listening time of the MP. The receiving of the beacons of other MPs can consume a significant amount of power, especially if the beacons are transmitted separately, each at its own appointed time. The power consumption problem is particularly of concern in battery powered MPs.

As currently specified the MP is expected to receive all peer MPs beacons, i.e., all MPs to which the local MP has a link, and remain active during its own beacon plus the ATIM period time.

Three representative publications that generally address power management in IEEE 802.11 networks include:
"Optimal ATIM size for 802.11 networks in ad hoc mode", X. Gao et al., DoCoMo Communications Lab USA (2006);
US Patent Publication No.: 2007/0133448, Jun. 14, 2007, "Method and Apparatus for Optimal ATIM Size Setup for 802.11 Networks in an Ad Hoc Mode", X. Gao et al.; and
US Patent Publication No.: 2006/0251004, Nov. 9, 2006, "Power Management in an IEEE 802.11 IBSS WLAN Using an Adaptive ATIM Window", Z. Zhong et al.

In accordance with section 11A.11 of draft 1.07 of the 802.11s amendment, a MP indicates its power management by setting a "Current Power Management Mode" bit in the power save capability field of the Mesh Capability element in its beacons and by sending a frame with the Power Management bit in the frame control field set (e.g., the frame control field of a MAC frame).

SUMMARY

In accordance with one exemplary aspect of the invention is a method that includes determining that a device in a wireless network is using a power saving mode on a peer-specific link and setting a state to indicate that the device is using a specific power saving mode of a plurality of power saving modes; and transmitting a message to the peer over the link comprising an indication of the state.

In accordance with yet another aspect of the invention is an apparatus that includes a processor configured to determine that a mesh point in a wireless network is using a power saving mode on a peer-specific link and to set a state to indicate that the device is using a specific power saving mode of a plurality of power saving modes. The apparatus further includes a transmitter configured to send a message to the peer over the link comprising an indication of the state In accordance with another exemplary aspect of the invention is an apparatus that includes processing means for determining that a mesh point in a wireless network is using a power saving mode on a peer-specific link and setting a state to indicate that the device is using a specific power saving mode of a plurality of power saving modes; and sending means for transmitting a message to the peer over the link comprising an indication of the state. In a particular embodiment that is consistent with this aspect of the invention, the processing means may be any one or multiple ones of the processors/chips shown at FIGS. 4A-4B; and the sending means may be a transmitter.

In accordance with another exemplary aspect of the invention is an apparatus that includes a processor which is configured to determine that a mesh point in a wireless network is using a power saving mode on a peer-specific link and setting a state to indicate that the mesh point is using a specific power saving mode of a plurality of power saving modes; and to send a message to the peer over the link comprising an indication of the state.

In accordance with another exemplary aspect of the invention is a computer readable memory storing a program that, when executed by a processor, causes actions directed to setting a link-specific power mode. In accordance with this aspect of the invention, the actions include determining that a mesh point in a wireless network is using a power saving mode on a peer-specific link and setting a state to indicate that the mesh point is using a specific power saving mode of a plurality of power saving modes; and sending a message to the peer over the link comprising an indication of the state.

BRIEF DESCRIPTION OF THE DRAWINGS

In the attached Drawing Figures:

FIG. 4B shows a more particularized block diagram of a device such as either of those shown at FIG. 4A.

FIG. 12 depicts a flowchart illustrating another non-limiting example of a method for practicing the exemplary embodiments of this invention;

FIG. 13 depicts a flowchart illustrating another non-limiting example of a method for practicing the exemplary embodiments of this invention; and FIG. 14 depicts a flowchart illustrating another non-limiting example of a method for practicing the exemplary embodiments of this invention.

DETAILED DESCRIPTION

As described in greater detail below, the exemplary embodiments of the invention provide improved power management techniques for use, e.g., in WLAN ad hoc networks, WLAN mesh networks or other wireless networks.

As utilized herein, the term "power management modes" refers to the different modes of operation available with respect to power management. The power management modes for a device include all such available modes regardless of whether they save power or not. The term "power saving modes" refers to those power management modes that provide some amount of power saving for the device. As is apparent, the power management modes for a device include the power saving modes.

Between a first device and a second device in a mesh network (e.g., 802.11s), the second device is considered a "peer MP" of the first device if there is an authenticated communication link between the first device and the second device (i.e., a communication link with one or more messages being directed from/to the first device to/from the second device, also referred to as a peer link). A non-peer MP is only able to use frames, which do not require authentication, when communicating with the other MP. Non-limiting examples of such frames include probe requests, peer link open frames or GAS query frames. As an example, a non-peer may receive a beacon message from a first device and respond with a frame in an attempt to establish a peer relationship with the first device.

For reference purposes, a "beacon MP" refers to the MP that transmits the beacon. Generally, this term will be used in conjunction with a non-peer MP that receives the beacon from the beacon MP and desires to establish a peer relationship by responding to the beacon (i.e., transmitting a frame to the beacon MP).

As utilized herein, a "field" comprises at least one bit and is used merely for organizational purposes. The term "field" should not be read in a limiting manner. For example, although referred to herein as two different fields, the bits of those two fields may instead be co-located within a single field so long as the bits serve the same purposes (i.e., the bits of the single field indicate the same information, individually or collectively, that would otherwise be indicated by bits in the separate fields).

Figure 1:
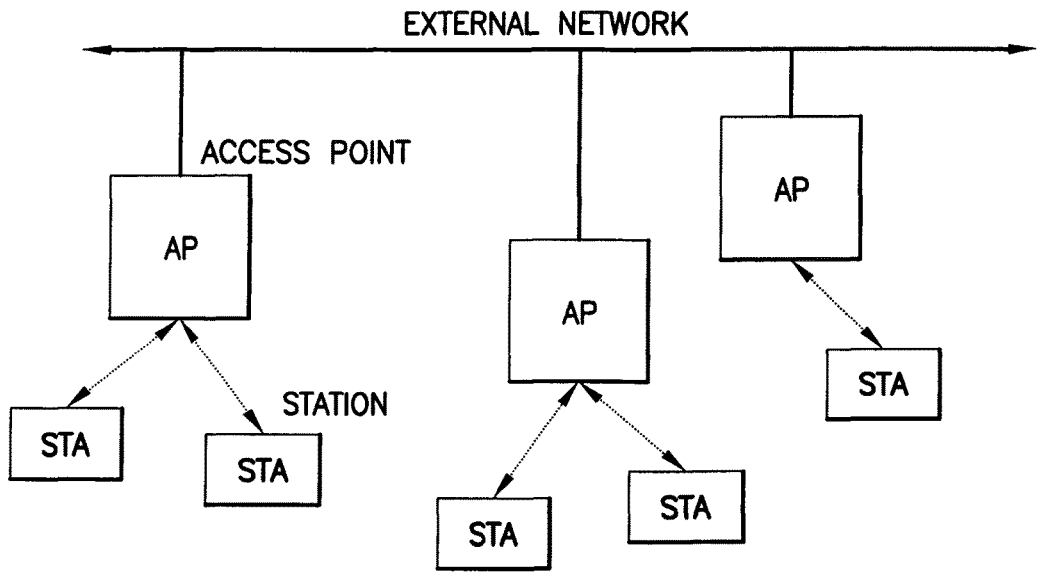
FIG. 1 reproduces FIG. s1 of the IEEE P802.11s™ Draft Standard, and shows a non-mesh IEEE 802.11 deployment model and device classes.
Figure 2:
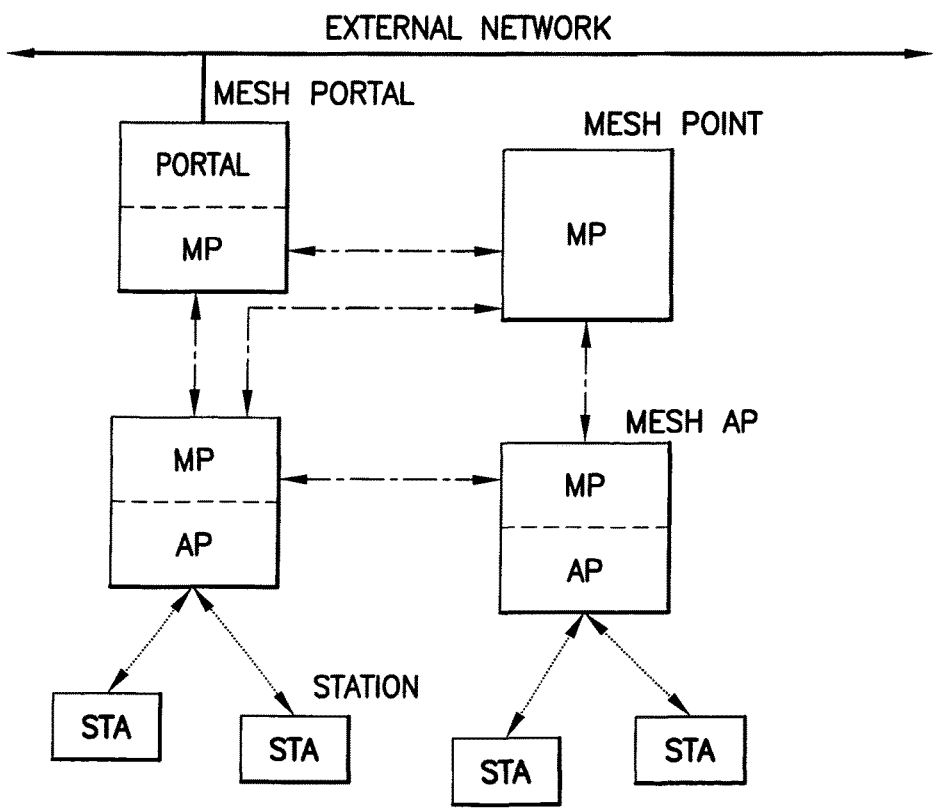
FIG. 2 reproduces FIG. s2 of the IEEE P802.11s™ Draft Standard, and shows a mesh containing MPs, MAPs, and STAs.
Figure 3A:
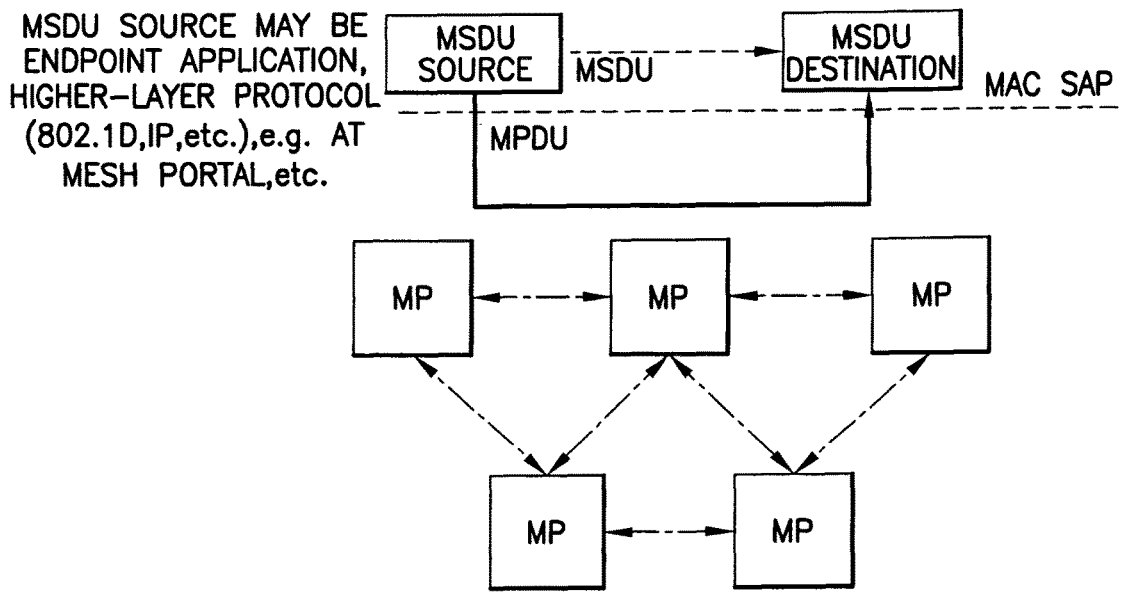
FIG. 3A reproduces FIG. s3 of the IEEE P802.11s™ Draft Standard, and shows MAC data transport over a Mesh.
Figure 3B:
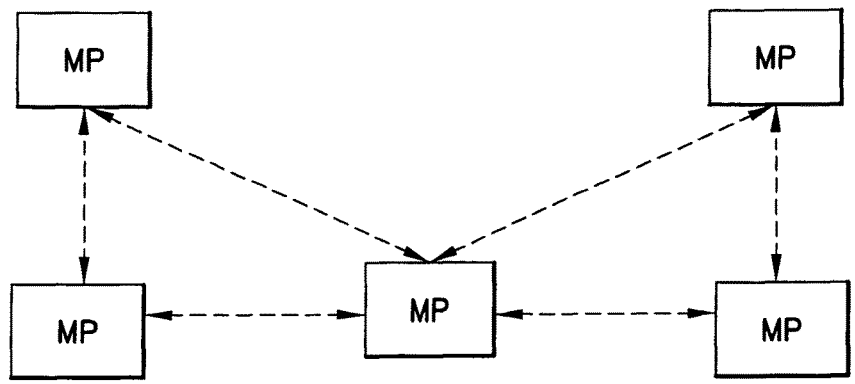
FIG. 3B depicts an exemplary ad hoc one hop networking model.
Figure 4A:
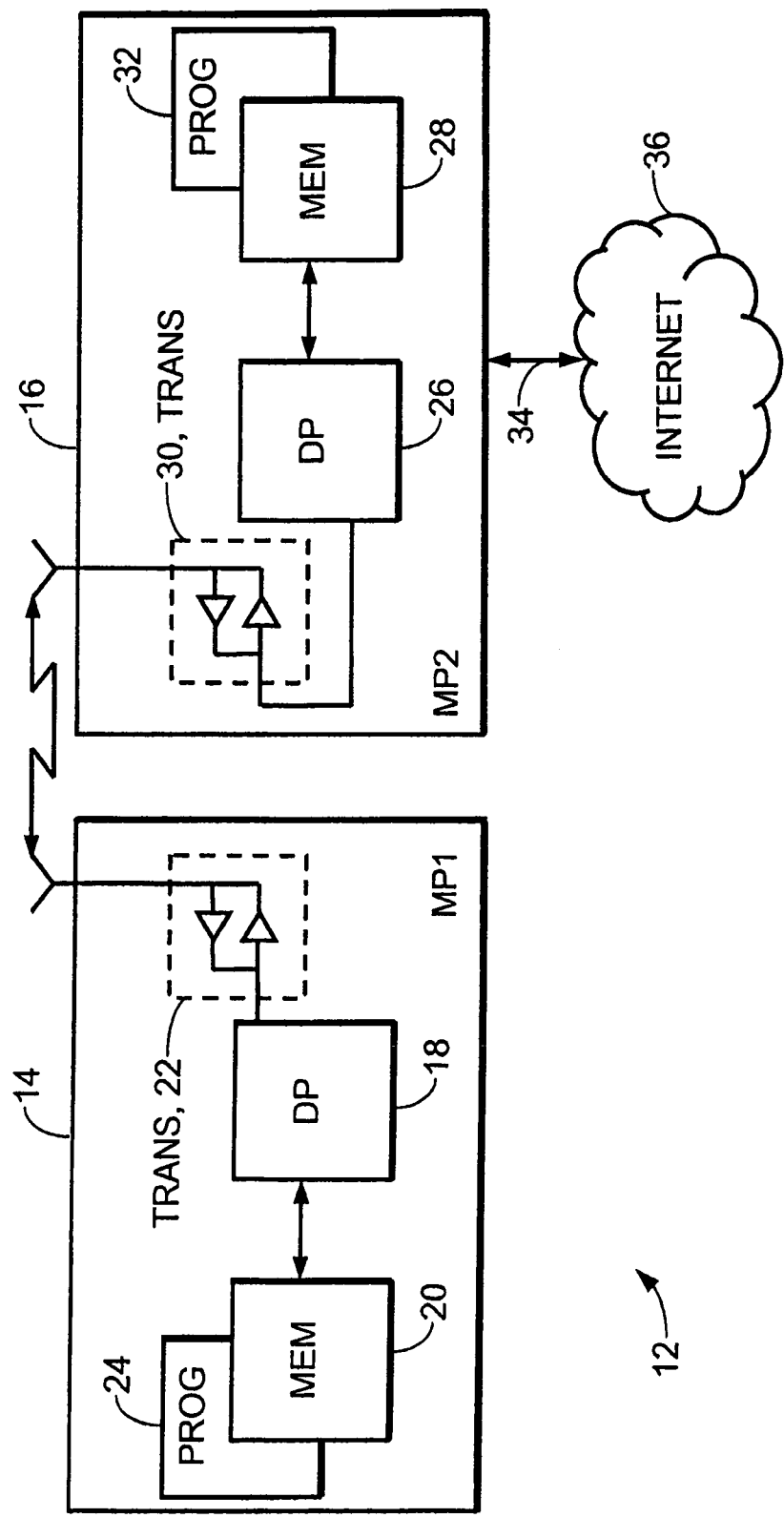
FIG. 4A shows a simplified block diagram of various electronic devices that are suitable for use in practicing the exemplary embodiments of this invention.

Reference is made to FIGS. 4A-B for illustrating a simplified block diagram of various electronic devices that are suitable for use in practicing the exemplary embodiments of this invention. In FIG. 4A, a wireless network 12 is adapted for communication with a first mesh point (MP1) 14 via a second mesh point (MP2) 16. The MP1 14 includes a data processor (DP) 18, a memory (MEM) 20 coupled to the DP 18, and a suitable RF transceiver (TRANS) 22 (having a transmitter (TX) and a receiver (RX)) coupled to the DP 18. The MEM 20 stores a program (PROG) 24. The TRANS 22 is for bidirectional wireless communications with the MP2 16. Note that the TRANS 22 has at least one antenna to facilitate communication.

The MP2 16 includes a data processor (DP) 26, a memory (MEM) 28 coupled to the DP 26, and a suitable RF transceiver (TRANS) 30 (having a transmitter (TX) and a receiver (RX)) coupled to the DP 26. The MEM 28 stores a program (PROG) 32. The TRANS 30 is for bidirectional wireless communications with the MP1 14. Note that the TRANS 30 has at least one antenna to facilitate communication. The MP2 16 is coupled via a data path 34 to one or more additional mesh points, external networks or systems, such as the internet 36, for example. Furthermore, the MP1 14 may also be coupled via a data path (not shown) to one or more additional mesh points, external networks or systems, such as the internet, for example.

At least one of the PROGs 24, 32 is assumed to include program instructions that, when executed by the associated DP, enable the electronic device to operate in accordance with the exemplary embodiments of this invention, as discussed herein.

In general, the various exemplary embodiments of the MP1 14 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by one or more of the DPs 18, 26 of the MP1 14 and the MP2 16, or by hardware, or by a combination of software and hardware. As a non-limiting example, one or more of the individual components of MP1 14 and/or MP2 16 may be implemented utilizing one or more integrated circuits (ICs) or application specific integrated circuits (ASICs).

The computer-readable MEMs 20, 28 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 18, 26 may be of any type suitable to the local technical environment, and may include one or more of general purpose computers, special purpose computers, microprocessors, digital signal processors (DSPs) and processors based on a multi-core processor architecture, as non-limiting examples.

FIG. 4B illustrates further detail of an exemplary MP 14 embodied as a user equipment in both plan view (left) and sectional view (right), and embodiments of the invention may be disposed in one or some combination of those more function-specific components. At FIG. 4B the MP 14 has a graphical display interface 40 and a user interface 41 illustrated as a keypad but understood as also encompassing touch-screen technology at the graphical display interface 40 and voice-recognition technology received at the microphone 42. A power actuator 43 controls the device being turned on and off by the user. The exemplary MP 14 may have a camera 44 which is shown as being forward facing (e.g., for video calls) but may alternatively or additionally be rearward facing (e.g., for capturing images and video for local storage). The camera 44 is controlled by a shutter actuator 45 and optionally by a zoom actuator 46 which may alternatively function as a volume adjustment for the speaker(s) 47 when the camera 44 is not in an active mode.

Within the sectional view of FIG. 4B are seen multiple transmit/receive antennas 48 that are typically used for wireless communication. The antennas 48 may be multi-band for use with other radios in the UE. The operable ground plane for the antennas 48 is shown by shading as spanning the entire space enclosed by the MP housing though in some embodiments the ground plane may be limited to a smaller area, such as disposed on a printed wiring board on which the power chip 50 is formed. The power chip 50 controls power amplification on the channels being transmitted and/or across the antennas that transmit simultaneously where spatial diversity is used, and amplifies the received signals. The power chip 50 outputs the amplified received signal to the WLAN chip 52 which demodulates and downconverts the signal for baseband processing. The baseband (BB) chip 53 detects the signal which is then converted to a bit-stream and finally decoded. Similar processing occurs in reverse for signals generated in the device/apparatus 14 and transmitted from it.

Signals to and from the camera 44 pass through an image/video processor 55 which encodes and decodes the various image frames. A separate audio processor 57 may also be present controlling signals to and from the speakers 47 and the microphone 42. The graphical display interface 40 is refreshed from a frame memory 60 as controlled by a user interface chip 58 which may process signals to and from the display interface 40 and/or additionally process user inputs from the keypad 41 and elsewhere.

Certain embodiments of the MP 14 may also include one or more further radios such as a cellular (radiofrequency RF) radio 49 with similar power and BB processing, and a Bluetooth® BT radio 51, which may incorporate an antenna on-chip or be coupled to an off-chip antenna. Throughout the apparatus are various memories such as random access memory RAM 54, read only memory ROM 56, and in some embodiments removable memory such as the illustrated memory card 59 on which the various programs 24 are stored. All of these components within the MP 14 are normally powered by a portable power supply such as a battery 61.

The aforeseaid processors 50, 52, 53, 55, 57, if embodied as separate entities in a MP 14, may operate in a slave relationship to the main processor 18, which may then be in a master relationship to them. Embodiments of this invention may be embodied at the baseband chip 53 where the baseband chip 53 commands the WLAN chip 52 as to how it sets data bits in the frame that are transmitted in the WLAN, though it is noted that other embodiments need not be disposed there but may be disposed across various chips (e.g., both BB chip 53 and WLAN chip 52; or other combinations) and memories as shown or disposed within another processor that combines some of the functions described above for FIG. 4B. Any or all of these various processors of FIG. 4B access one or more of the various memories, which may be on-chip with the processor or separate therefrom.

Note that the various chips (e.g., 50, 52, 53, etc.) that were described above may be combined into a fewer number than described and, in a most compact case, may all be embodied physically within a single chip.

Reference is also made to U.S. provisional application Ser. No. 60/993,663 (filed Sep. 12, 2007, now U.S. application Ser. No. 12/283,101 filed Sep. 8, 2008).

I. Power Management Level Field

In a first, non-limiting exemplary embodiment, MP operation is as follows. The MP has, as a non-limiting example, three different power management modes of operation, for example: full power, light sleep and deep sleep. The three exemplary modes are specified as follows:

FULL POWER (ACTIVE) MODE: The MP is always awake. When the MP is not transmitting data or its own beacon, it is ready to receive any transmission directed to it.

LIGHT SLEEP MODE: The MP is awake during the time needed to send its own beacon and receive peer MP beacons. When it is not transmitting or receiving (i.e., receiving other beacons or data), the MP may sleep.

DEEP SLEEP MODE: The MP only transmits its own beacon and does not receive peer MP transmissions. However, broadcast and multicast frames may be forwarded during DTIM beacon transmission. The deep sleep mode may break connectivity between two MPs if both of them are operating in deep sleep mode.

Since the light sleep and deep sleep modes provide some amount of power saving, these two modes are considered power saving modes. Note that in other exemplary embodiments, the MP may have a greater or lesser number of different power management modes (e.g., two modes, four modes).

As noted above, in accordance with section 11A.11 of draft 1.07 of the 802.11s amendment, a MP indicates its power management in a beacon by setting a Power Management bit in the frame control field (e.g., the frame control field of a MAC frame). The Power Management bit indicates whether or not the MP is using a power saving mode. Since only one bit is used, the MP can only indicate two modes of operation, namely a full power mode (a bit value of 0) or a power saving mode (a bit value of 1). If more than one power saving mode is available, such as the two exemplary power saving modes described immediately above, the Power Management bit specified by draft 1.07 of 802.11s is insufficient for signaling purposes.

The first exemplary embodiment of the invention enables enhanced power management by providing a new field, herein referred to as a Power Management Level field. The Power Management Level field allows a MP to signal more than one power saving mode and comprises at least one bit utilized for this purpose. While shown and discussed below with one bit, other exemplary embodiments may utilize more than one bit to provide signaling for more than two power saving modes. The Power Management Level field may be used, for example, in the mesh header of a MAC frame.

For illustration purposes, exemplary values of the Power Management bit and a one-bit Power Management Level field are shown below in Table 1.

TABLE 1

Power management mode indicated using Power Management and Power Management Level bit values.

| Power Management Mode | Power Management Bit | Power Management Level Bit |
|---|---|---|
| Full Power | 0 | 0 |
| Light Sleep | 1 | 0 |
| Deep Sleep | 1 | 1 |

It should be noted that any indications discussed herein with respect to certain numbers of bits may be performed using different numbers of bits. For example, instead of a one-bit field, the Power Management field may instead consist of two or three bits, as non-limiting examples. By way of further example, in such a case the indications may comprise: all bit values of "0" indicating no power saving mode is being used, and any bit value other than "0" indicating that a power saving mode is being used. Thus, the exemplary embodiments of the invention are not limited to any specific type of bit indications.

Three non-limiting options for utilizing the Power Management Level field are described below. Although it is not further indicated below, one may assume that each of the three options uses the Power Management Level field to signal the particular power saving mode being used by a respective MP.

I.(a) Option 1: Full Peer MP-Based Power Management

In option 1, power management is peer MP-based and, thus, the power saving mode can be different for different peer MPs. The MPs may use the following rules for changing the link power saving mode.

If a MP decides that it needs to conserve power and move to a lower activity level (e.g., from full power to light sleep or deep sleep, or from light sleep to deep sleep), it will send any acknowledgeable unicast frame to a peer MP indicating that it wishes to change its power saving mode. The MP will send this frame to one or more peer MPs. If there are no actual data frames to be sent, the MP may use a null frame. When the peer MP(s) have acknowledged the message, the MP may change its actual internal power mode to the new power saving mode, if needed, and all subsequent frames to the peer MP will be sent with the new power saving mode.

If a MP decides that it needs to raise its activity level (e.g., from deep sleep to light sleep or full power, or from light sleep to full power), it will send an acknowledgeable unicast frame to the one or more peer MPs indicating that it wishes to change its power saving mode. If there are no actual data frames to be sent, the MP may use a null frame or wait until a beacon is sent. The MP will change to the new power saving mode before sending a frame with the new raised activity level. Subsequent frames will be sent with the new power saving mode.

Other MPs that do not have a link established with the MP in question follow the power saving mode indicated in the beacon. Peer MPs may not take into account the power saving mode indicated in the beacon (e.g., if they are signaled otherwise).

This option may be particularly advantageous since, if necessary, a MP can change the power saving mode for individual links with peer MPs. This may be useful, for example, when there is an intermittent need to transmit over a single or small number of links and the MP generally would prefer to operate in a power saving mode. In accordance with option 1, only needed links are raised to a higher activity level (e.g., full power mode). A disadvantage of option 1 is that a MP must keep a record of the power saving mode for its peer MPs.

I.(b) Option 2: First Partial Peer MP-Based Power Management

In option 2, power management is partially peer MP-based. A base power saving mode is known and shared by all peer MPs. However, power saving modes still can be different for different peer MPs but only in the more active mode direction. Thus, the MPs may have a more active power saving mode than the base power saving mode for some links, but the MPS cannot have a less active power saving mode than the base power saving mode. The MPs may use the following rules for changing the link power saving mode.

If a MP decides that it needs to conserve power and move to a lower activity level mode (e.g., from full power to light sleep or deep sleep, or from light sleep to deep sleep), it will send any acknowledgeable unicast frame to all of its peer MPs. If there are no actual data frames to be sent, the MP may use a null frame. When the peer MPs have acknowledged the message, the MP may change its power saving mode. Subsequent frames will be sent with the new power saving mode. Note that the MP internally changes to the lower activity mode once it has received acknowledgements from all of the peer MPs.

If a MP decides that it needs to raise its activity level (e.g., from light sleep or deep sleep to full power, or from deep sleep to light sleep), it may send any unicast or broadcast/multicast frame to all of its peer MPs immediately. If there are no actual data frames to be sent, the MP may use a null frame or simply wait until a beacon is sent. Thus, the next beacon frame is sent to the peer MPs using the new power saving mode. The MP changes to the new power saving mode immediately (i.e., immediately before or immediately after sending a frame with the new raised activity level) and subsequent frames will be sent with the new power saving mode.

If a MP is in the deep sleep mode it may choose to temporarily move from the deep sleep mode to the light sleep or full power mode for one or more peer MPs. In this case, the new power saving mode for those links is sent in frames directed only to the respective peer MPs.

Peer MPs may use unicast and/or multicast/broadcast frames to follow changes in the power saving mode for a MP. Other MPs that do not have a link established to the MP (i.e., other MPs that are not peer MPs) follow the power management mode and power saving mode indicated in the corresponding beacon. Note that in some cases, peer MPs may also follow the power saving mode indicated in the beacon. Thus, the power saving mode for a peer MP may (or may not) be different from the power saving mode for other MPs, but only such that the broadcasted power saving mode (e.g., the base power saving mode) is lower (less active) than the power saving mode for the peer MP.

Figure 5:
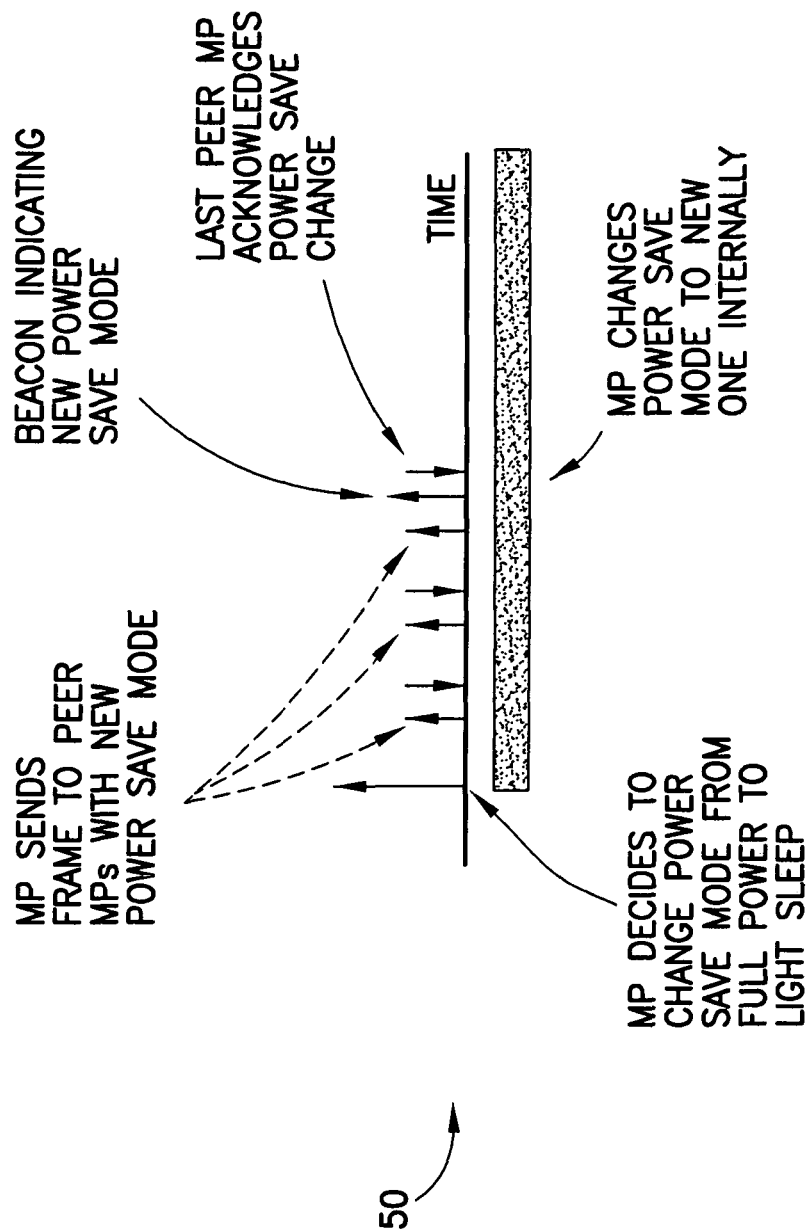
FIG. 5 shows exemplary power saving mode changes for a MP in accordance with an aspect of the exemplary embodiments of the invention.

FIG. 5 shows exemplary power saving mode changes 50 for a MP in accordance with an aspect of the exemplary embodiments of the invention.

This option is advantageous in that the base power saving mode is broadcast in the beacons (and other broadcasted frames) and all of the MPs can follow and adjust to the base power mode quite fast. However, option 2 is not as flexible as option 1 and MPs still must keep a record of the power saving mode for all peer MPs.

I.(c) Option 3: Second Partial Peer MP-Based Power Management

Option 3 is very similar to option 2, however the MP transmits two different power saving modes in its beacon, one for peer MPs and one for other (non-peer) MPs. Unless indicated otherwise for a certain peer MP, the respective peer or non-peer MPs follow the corresponding power saving mode in the beacon.

Option 3 provides more flexibility than option 2. However, option 2 generally is still not as flexible as option 1 may be.

I.(d) Further Discussion of the Power Management Level Field Embodiments

The exemplary embodiments described above with respect to the Power Management Level field provide improved power management, for example, in WLAN mesh networks by enabling a MP to signal the particular power saving mode being used by the MP. This additional signaling also provides increased flexibility since a device (e.g., a MP) has the potential to implement one of many power saving modes.

Figure 6:
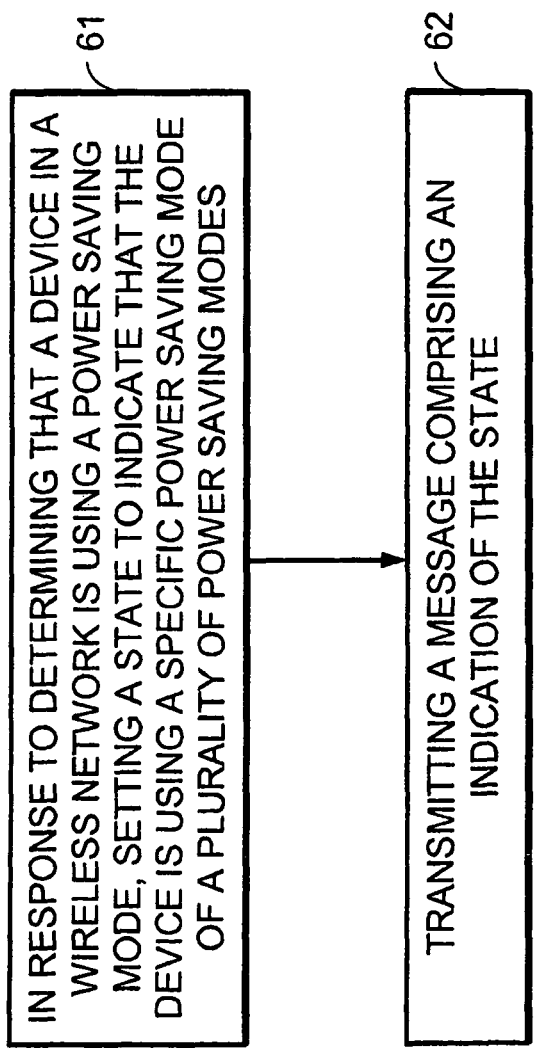
FIG. 6 depicts a flowchart illustrating one non-limiting example of a method for practicing the exemplary embodiments of this invention.

In one non-limiting exemplary embodiment, and as illustrated in FIG. 6, a method comprises: in response to determining that a device in a wireless network is using a power saving mode, setting a state to indicate that the device is using a specific power saving mode of a plurality of power saving modes (box 61); and transmitting a message comprising an indication of the state (box 62). As detailed above, this power saving mode is specific to a peer or link for a peer.

A method as in any of the above paragraphs, wherein the state comprises a first state, the method further comprising: setting a second state to indicate that the device is using a power saving mode. A method as above, wherein the second state is set in response to the first state being set. A method as in any of the above, wherein the indication comprises a first indication, wherein the message further comprises a second indication for the second state.

A method as in any of the above paragraphs, wherein the indication of the state comprises at least one bit. A method as above, wherein the at least one bit comprises at least one second bit, the method further comprising: setting a state of at least one first bit to indicate that the device is using a power saving mode. A method as in any of the above, wherein the at least one second bit is set in response to setting the at least one first bit. A method as in any of the above, wherein the message further comprises the at least one first bit.

A method as in any of the above paragraphs, wherein the device has a plurality of communication links with a plurality of other devices, wherein the device uses at least two different power saving modes for at least two different links of the plurality of communication links. A method as in any of the above, wherein the plurality of power saving modes correspond to a plurality of activity levels, wherein the plurality of power saving modes includes a base power saving mode corresponding to a base activity level, wherein the device cannot use a power saving mode corresponding to an activity level lower than the base activity level. A method as in any of the above, wherein the at least one bit comprises at least one first bit, wherein the power saving mode comprises a first power saving mode for peer MPs, the method further comprising: setting a state of at least one second bit to indicate a second power saving mode for non-peer MPs, wherein the message comprises a beacon transmission from the device, wherein the message further comprises the at least one second bit.

A method as in any of the above par graphs, wherein the wireless network comprises a wireless local area network. A method as in any of the above, wherein the device comprises a mesh point in the wireless network. A method as in any of the above, wherein the wireless network comprises a wireless local area mesh network. A method as in any of the above, wherein the wireless network comprises an ad hoc wireless local area network. A method as in any of the above, wherein the message comprises a beacon transmission from the device. A method as in any of the above, wherein the method is performed by the device. A method as in any of the above, wherein the message comprises a unicast transmission. A method as in any of the above, wherein the message comprises a broadcast transmission or a multicast transmission. A method as in any of the above, wherein the method is implemented by a computer program executed by the device. A method as in any of the above, wherein the method is implemented by an integrated circuit of the device.

In another non-limiting, exemplary embodiment, a computer program product (i.e., any computer-readable medium) comprises program instructions embodied on a tangible computer-readable medium. Execution of the program instructions results in operations comprising: in response to determining that a device in a wireless network is using a power saving mode, setting a state to indicate that the device is using a specific power saving mode of a plurality of power saving modes; and transmitting a message comprising an indication of the state.

A computer program product as in any of the above, wherein the state comprises a first state, execution of the program instructions resulting in operations further comprising: setting a second state to indicate that the device is using a power saving mode. A computer program product as in any of the above, wherein the second state is set in response to the first state being set. A computer program product as in any of the above, wherein the indication comprises a first indication, wherein the message further comprises a second indication for the second state.

A computer program product as in any of the above, wherein the indication of the state comprises at least one bit. A computer program product as in any of the above, wherein the at least one bit comprises at least one second bit, execution of the program instructions resulting in operations further comprising: setting a state of at least one first bit to indicate that the device is using a power saving mode. A computer program product as in any of the above, wherein the at least one second bit is set in response to setting the at least one first bit. A computer program product as in any of the above, wherein the message further comprises the at least one first bit.

A computer program product as in any of the above, wherein the device has a plurality of communication links with a plurality of other devices, wherein the device uses at least two different power saving modes for at least two different links of the plurality of communication links. A computer program product as in any of the above, wherein the plurality of power saving modes correspond to a plurality of activity levels, wherein the plurality of power saving modes includes a base power saving mode corresponding to a base activity level, wherein the device cannot use a power saving mode corresponding to an activity level lower than the base activity level. A computer program product as in any of the above, wherein the at least one bit comprises at least one first bit, wherein the power saving mode comprises a first power saving mode for peer MPs, execution of the program instructions resulting in operations further comprising: setting a state of at least one second bit to indicate a second power saving mode for non-peer MPs, wherein the message comprises a beacon transmission from the device, wherein the message further comprises the at least one second bit.

A computer program product as in any of the above, wherein the wireless network comprises a wireless local area network. A computer program product as in any of the above, wherein the device comprises a mesh point in the wireless network. A computer program product as in any above, wherein the wireless network comprises a wireless local area mesh network. A computer program product as in any of the above, wherein the wireless network comprises an ad hoc wireless local area network. A computer program product as in any of the above, wherein the message comprises a beacon transmission from the device. A method as in any of the above, wherein the program instructions are executed by a processor of the device. A computer program product as in any of the above, wherein the message comprises a unicast transmission. A computer program product as in any of the above, wherein the message comprises a broadcast transmission or a multicast transmission.

In another non-limiting, exemplary embodiment, an apparatus comprises: a controller configured, in response to determining that the apparatus is using a power saving mode, to set a state to indicate that the apparatus is using a specific power saving mode of a plurality of power saving modes; and a transmitter configured to transmit a message comprising an indication of the state, wherein the apparatus comprises a node or a component thereof in a wireless network.

An apparatus as in any of the above, wherein the state comprises a first state, wherein the controller is further configured to set a second state to indicate that the device is using a power saving mode. An apparatus as in any of the above, wherein the controller sets the second state in response to setting the first state. An apparatus as in any of the above, wherein the indication comprises a first indication, wherein the message further comprises a second indication for the second state.

An apparatus as in any of the above, wherein the indication of the state comprises at least one bit. An apparatus as in any of the above, wherein the at least one bit comprises at least one second bit, wherein the controller is further configured to set a state of at least one first bit to indicate that the apparatus is using a power saving mode. An apparatus as in any of the above, wherein the at least one second bit is set by the controller in response to setting the at least one first bit. An apparatus as in any of the above, wherein the message further comprises the at least one first bit.

An apparatus as in any of the above, wherein the apparatus has a plurality of communication links with a plurality of other devices, wherein the apparatus uses at least two different power saving modes for at least two different links of the plurality of communication links. An apparatus as in any of the above, wherein the plurality of power saving modes correspond to a plurality of activity levels, wherein the plurality of power saving modes includes a base power saving mode corresponding to a base activity level, wherein the apparatus cannot use a power saving mode corresponding to an activity level lower than the base activity level. An apparatus as in any of the above, wherein the at least one bit comprises at least one first bit, wherein the power saving mode comprises a first power saving mode for peer MPs, wherein the controller is further configured to set a state of at least one second bit to indicate a second power saving mode for non-peer MPs, wherein the message comprises a beacon transmission from the apparatus, wherein the message further comprises the at least one second bit.

An apparatus as in any of the above, wherein the wireless network comprises a wireless local area network. An apparatus as in any of the above, wherein the apparatus comprises a mesh point in the wireless network. An apparatus as in any of the above, wherein the wireless network comprises a wireless local area mesh network. An apparatus as in any of the above, wherein the wireless network comprises an ad hoc wireless local area network. An apparatus as in any of the above, wherein the message comprises a beacon transmission from the device. An apparatus as in any of the above, wherein the message comprises a unicast transmission. An apparatus as in any of the above, wherein the message comprises a broadcast transmission or a multicast transmission. An apparatus as in any of the above, further comprising a receiver configured to receive a second message from a second apparatus. An apparatus as in any of the above, wherein the controller comprises a processor. An apparatus as in any of the above, wherein the apparatus comprises one of a cellular phone, a personal digital assistant having wireless communication capabilities, a portable computer having wireless communication capabilities, an image capture device having wireless communication capabilities, a gaming device having wireless communication capabilities, a music storage and playback appliances having wireless communication capabilities or an Internet appliance permitting wireless Internet access.

In another non-limiting, exemplary embodiment, an apparatus comprises: means, in response to determining that the apparatus is using a power saving mode, for setting a state to indicate that the apparatus is using a specific power saving mode of a plurality of power saving modes; and means for transmitting a message comprising an indication of the state, wherein the apparatus comprises a node in a wireless network. An apparatus as above, wherein the means for setting comprises at least one processor and the means for transmitting comprises a transmitter.

II. Eliminating the ATIM Period

It is noted that in addition to the light sleep mode described above, there may be an additional light sleep mode wherein the MP can receive at least all of the DTIM beacons from its peer MPs. That is, the awake window may be used even though the mesh point operates in the light sleep mode and the service period triggering may be performed outside of the awake window which is retained for other purposes. This additional light sleep mode is very similar to the previously-described light sleep mode and, except for this brief description, no further distinction between these two light sleep modes will be observed. As utilized herein, the term "light sleep mode" may be seen to refer to one or both of the identified light sleep modes, as non-limiting examples.

In accordance with draft 1.07 of 802.11s, after every beacon an ATIM period is used to set up service periods between MPs. This operation is further described below with respect to FIG. 7.

Figure 7:
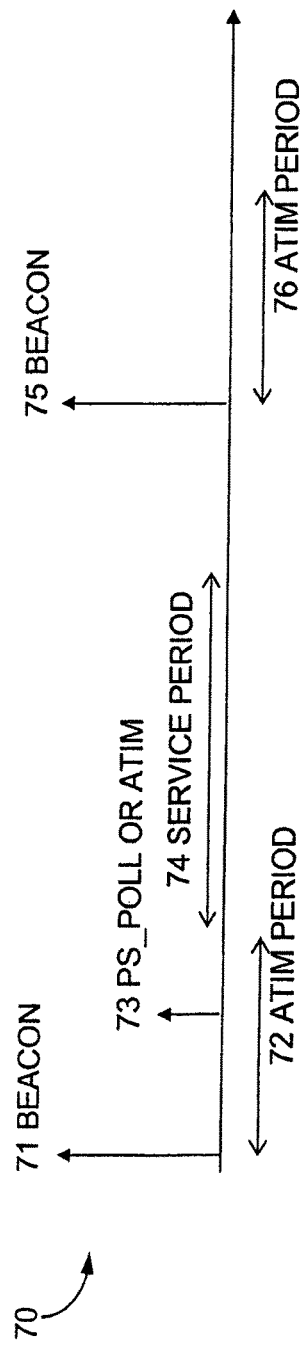
FIG. 7 shows the beacon time periods as provided by draft 1.07 of the 802.11s amendment.

FIG. 7 shows the beacon time periods 70 as provided by draft 1.07 of the 802.11s amendment. A beacon 71 is transmitted from MP1. The beacon 71 is transmitted with a set TIM bit for MP2 indicating that MP1 has buffered traffic for MP2. If a TIM bit is set, MP1 waits to receive a trigger frame. The beacon frame defines an ATIM period, identified herein as time period 72, during which MP1 can receive requests (e.g., PS-Poll or ATIM frames) to initiate a service period. The MP transmitting the beacon 71 (i.e., MP1) will be available for the duration of the ATIM period 72 and will not transmit any data during that period. Having received the beacon 71 with a set TIM bit for itself, MP2 responds by transmitting a PS_Poll or ATIM 73, during the ATIM period 72. Upon receiving the PS_Poll or ATIM 73, MP1 knows to establish a service period 74 during which MP1 and MP2 can communicate with each other (i.e., send messages to one another, e.g., using unicast or bidirectional communication). Service period 74 begins after the ATIM period 73 ends. As shown in FIG. 7, MP1 may subsequently transmit a second beacon at time 75, repeating the described process (e.g., by establishing a second ATIM period 76 if a TIM bit is set in the beacon 75). In this example, MP2 is a non-peer MP prior to the establishment of the service period 74. Once the service period 74 is set up, thus enabling communication between MP1 and MP2, MP2 becomes a peer MP of MP1.

A non-peer MP may select an appropriate transmission time (e.g., an ATIM period) for a transmission to a power saving beacon MP. As an alternative, the non-peer MP may instead transmit a frame at any time (e.g., immediately) and hope that the frame is received by the beacon MP.

Figure 8:
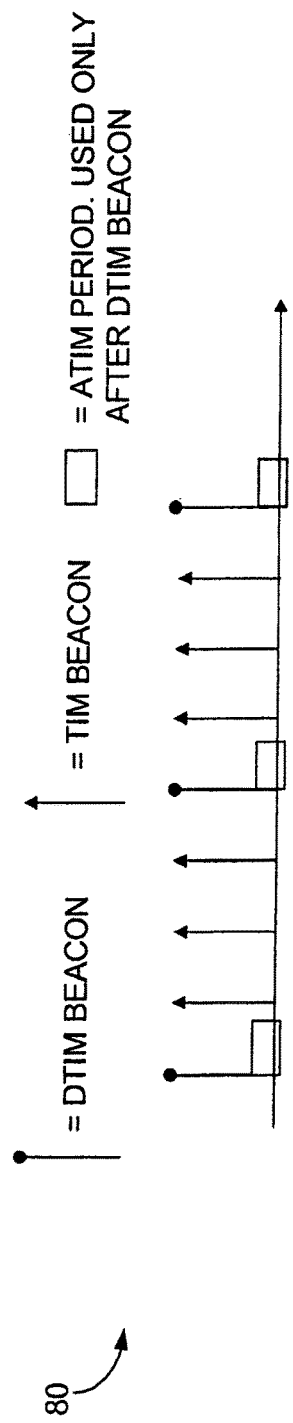
FIG. 8 illustrates the beaconing flow with respect to DTIM beacons and TIM beacons.

As described by draft 1.07 of 802.11s, MPs in the light sleep mode only have an ATIM period after their DTIM beacon transmission. The ATIM period ensures that non-peer MPs are able to transmit data to the beacon MP. If the beacon MP in a light sleep mode does not have traffic to transmit, it will listen to media for ATIM period duration after the mesh DTIM beacon. The beaconing flow 80 with respect to DTIM beacons and TIM beacons is illustrated in FIG. 8. As can be seen, ATIM periods are provided only after DTIM beacons and not after TIM beacons.

After a successful request transmission (e.g., transmission of a probe request, GAS frame or first peer link open message), the non-peer MP remains active, waiting for a response or other peer link setup message from the beacon MP. If the request is unicast, the power management bit value may be set to "0" to indicate the full power mode of operation. If the request is multicast or broadcast, the power management bit value may be set according to the current operation mode of the peer MP.

Upon receipt of the request and subsequent creation and signaling concerning the service period (e.g., an ACK), the beacon MP becomes active (e.g., full power mode, ready to receive a communication). The beacon MP may remain active until all specific data transmission flows with the other MP have been performed (e.g., until the beacon MP has transmitted all the buffered traffic). Afterwards, the beacon MP may return to a sleep mode (e.g., light sleep or deep sleep) and turn its receiver off. The operation between the beacon MP and the other MP may not be dependent on the power management mode or power saving mode of the other MP.

If authentication in the peer link establishment portion is unsuccessful or if either MP considers that requests are causing or simulating a denial of service attack, the MP may not send any frame in reply and may change to a sleep mode.

In other and/or further exemplary embodiments of the invention, improved power management techniques are provided as follows.

Described below are three non-limiting, exemplary embodiments of the invention involving, for example, operational logic for buffered traffic handling for peer MPs in a light sleep mode. In the first of the three exemplary embodiments, the beacon MP stays active for initiation of the specific MP's service period. In the second, the beacon MP stays active for the duration of the beaconing period (i.e., until the successive beacon transmission). In the third, the previous two options are combined and the beacon MP signals its operational logic in the beacon. These three exemplary embodiments are further discussed below.

II.(a) Substantially Immediate Initiation

This exemplary embodiment focuses on transmitting the buffered traffic and offers the possibility of triggering a service period for MPs (i.e., "the other MP") that receive an indication of the buffered traffic in the beacon frame.

The beacon MP (MP1) indicates buffered traffic for another peer MP (MP2), for example, by setting a bit to 1 in a TIM field of the beacon frame it transmits. The TIM bit may be set for all MPs, MPs operating in a power saving mode, MPs using a light sleep mode or MPs using a deep sleep mode, as non-limiting examples. MP2 may respond to the beacon MP as previously described with a trigger frame.

The received trigger frame initiates a service period from MP1 to the triggering MP (MP2). If unidirectional service periods are used for the link and the trigger frame is a data frame, two unidirectional service periods are triggered (i.e., one for transmitting and one for receiving). The unidirectional and bi-directional service periods and the termination of the service periods are described in more detail in Exhibit A. If the beacon MP receives a frame from a MP that did not have a bit set in the TIM element in the beacon frame, the beacon MP will not consider the frame as a trigger frame. The beacon MP may acknowledge the frame, but it does not start a service period with the MP.

When the beacon MP is subsequently operating in a power saving state (e.g., has the power management bit set to "1") for all links, it does not have any ongoing service periods, and all light-sleeping MPs that had a bit set in the previous beacon's TIM element have triggered a corresponding service period, the beacon MP may turn its receiver off. In other exemplary embodiments a fewer or greater number of conditions may be used to determine when the beacon MP can turn its receiver off. In further exemplary embodiments, different conditions may be used.

Figure 9:
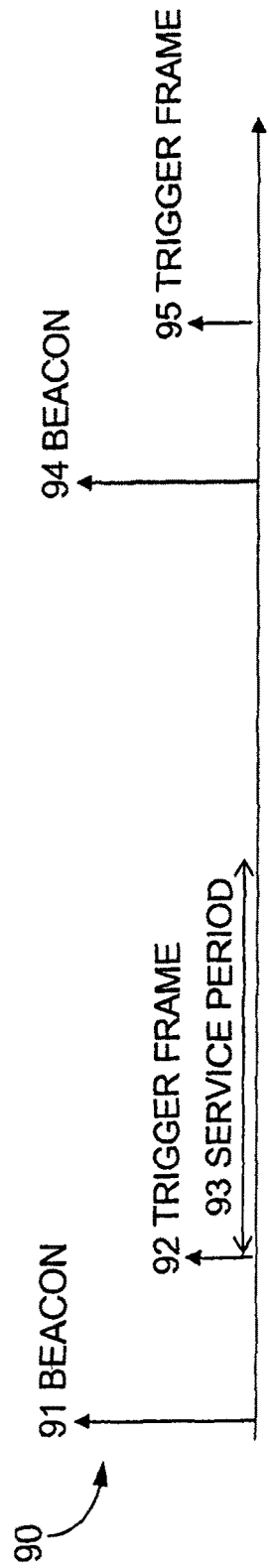
FIG. 9 illustrates signaling operations in accordance with an aspect of the exemplary embodiment of the invention that does not use an ATIM period

FIG. 9 illustrates the operations in accordance with an aspect of the exemplary embodiment of the invention that does not use an ATIM period, as described herein. Similar to the previously-described exemplary embodiments, a beacon 91 is transmitted from the beacon MP (MP1) with a TIM bit set for another MP (MP2). Since a TIM bit is set, MP1 will wait for a trigger frame 92 from MP2. In response to receiving the beacon 91, MP2 responds with a trigger frame 92. MP1 receives the trigger frame 92 and, in response to said reception, substantially immediately initiates a service period 93 for MP2. As above, one or more additional beacons 94 and trigger frames 95 may follow, operating in a similar manner. In further exemplary embodiments, an ACK (e.g., a MAC-level ACK) for the trigger frame 92 may be transmitted from MP1 to MP2 prior to substantially immediately initiating the service period 93. Further reference with regard to such exemplary embodiments is made to FIG. 10 and the discussion thereof below.

Note that TIM bits may also be set for deep-sleeping MPs, however those MPs in a deep sleep mode do not stay active and, thus, the beacon MP does not need to stay active to receive trigger frames from them.

Considering this exemplary embodiment from the other side, a MP (MP2) in a light sleep mode receives a beacon from MP1 that has a TIM bit set indicating buffered traffic for itself (i.e., MP2).

In response, MP2 transmits a trigger frame to trigger a service period and try to obtain the buffered traffic. The trigger frame may comprise a data frame, a null frame or a management frame, as non-limiting examples.

If MP2 successfully triggers a service period and unidirectional service periods are used, two unidirectional service periods are triggered. The triggering MP may set EOSP and/or other data bits in the triggering frame to indicate, for example, that it does not have any traffic to transmit. The set EOSP bit terminates the service period. As non-limiting examples, the unidirectional and bidirectional service periods may be as described in Exhibit A. If the link uses bidirectional service periods, the triggered service period may always be bidirectional, regardless of the trigger frame used.

Figure 10:
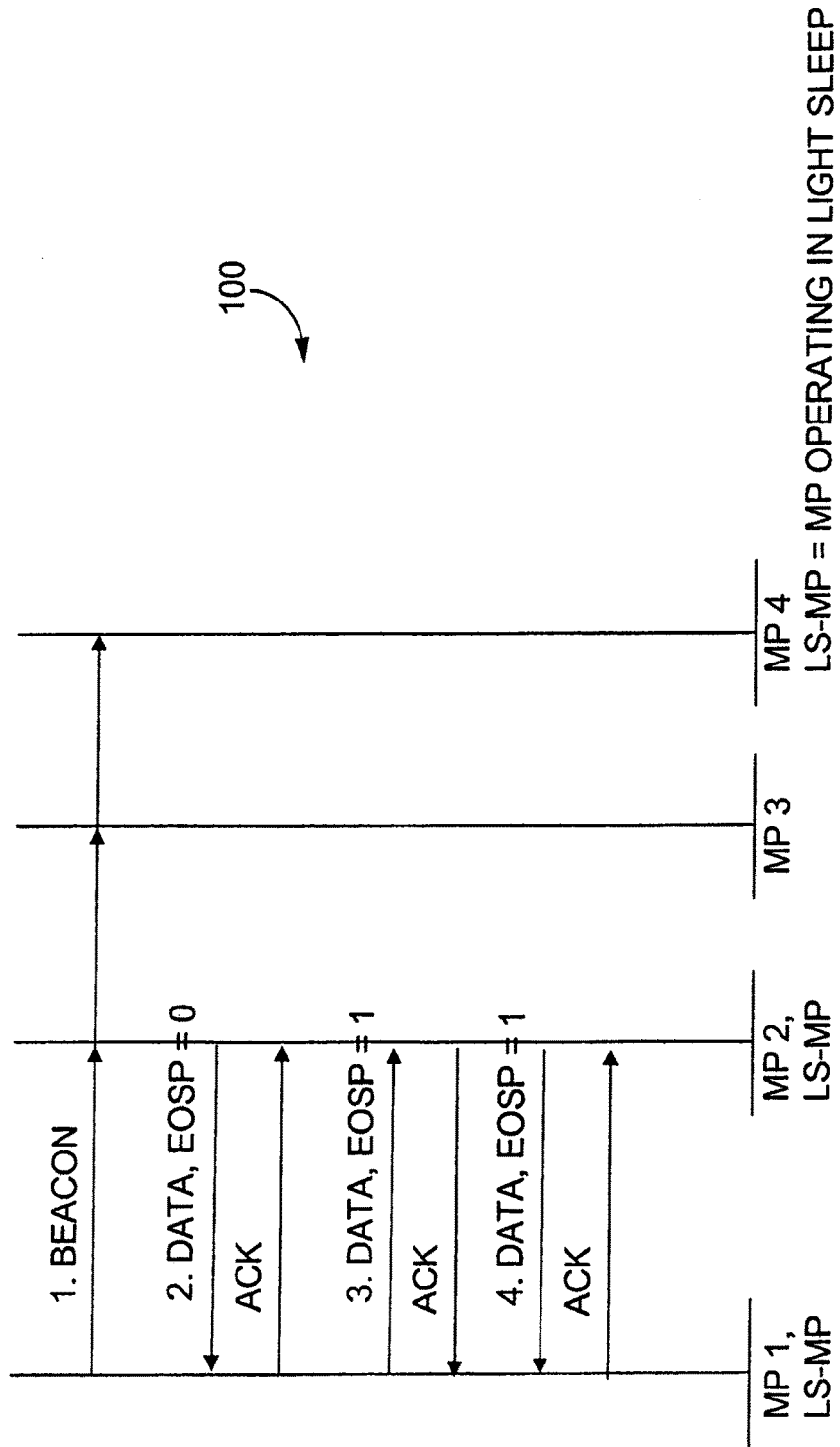
FIG. 10 shows a non-limiting, exemplary message diagram for a unidirectional service period arrangement.

Reference is made to FIG. 10 for illustrating a non-limiting, exemplary message diagram 100 for a unidirectional service period arrangement. In step 1, MP1 transmits a beacon. The beacon frame comprises set bits in the TIM field for MP2. In step 2, MP2 triggers a service period by using a data frame. The trigger frame triggers two unidirectional service periods. In step 3, MP1 terminates its own service period by setting eosp to "1" in the transmitted frame. Another possibility is for the MP1 to indicate that no more buffered frames exist for transmission (e.g., set the corresponding data bit(s) to "0"). After the service period termination, the MP1 is no longer able to transmit data frames during the same service period to MP2. In step 4, MP2 terminates its service period. All frames that initiate or terminate the service period are acknowledged (e.g., using MAC-level ACKs or block ACKs).

Figure 11:
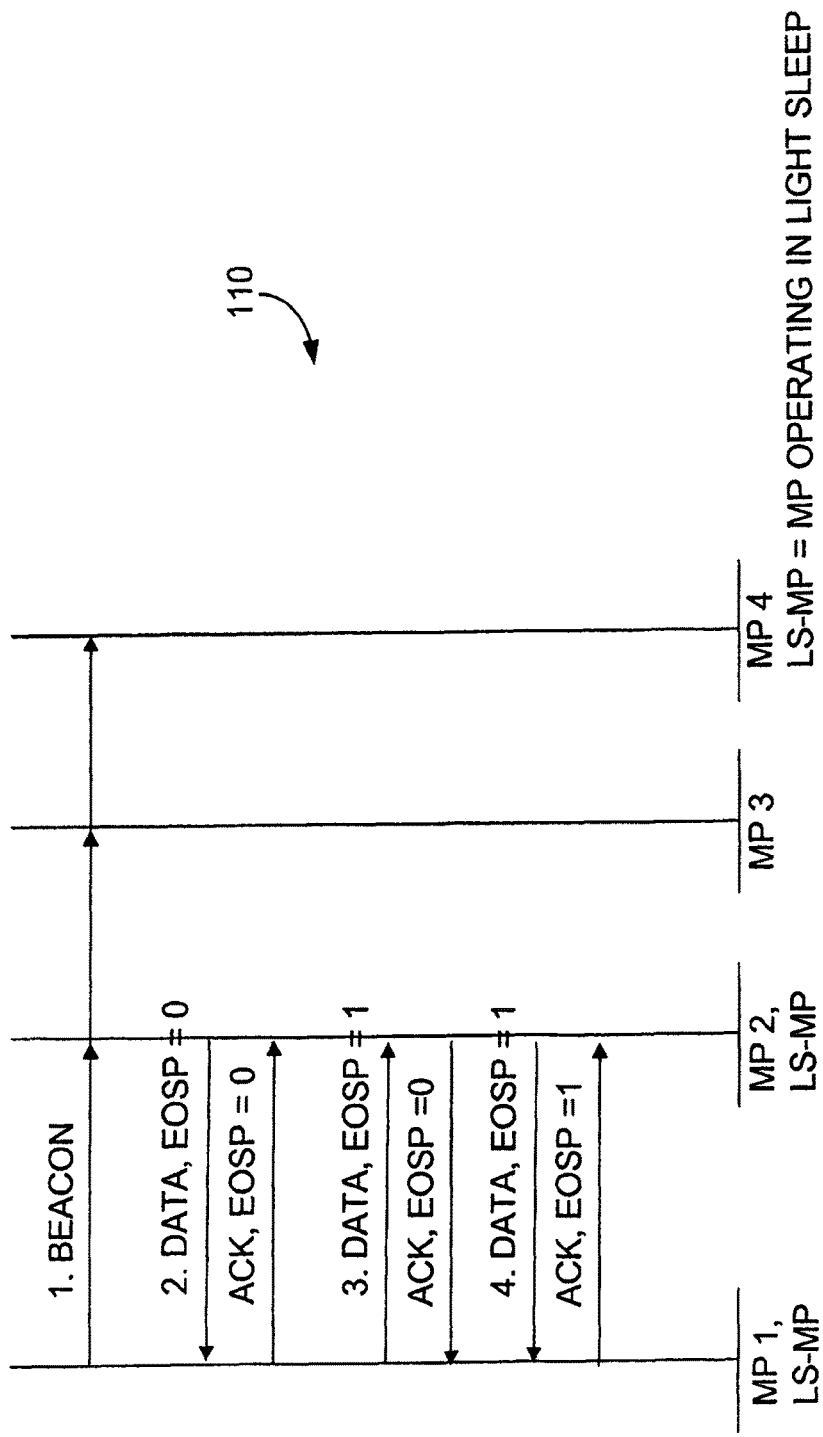
FIG. 11 shows a non-limiting, exemplary message diagram for a bidirectional service period arrangement.

Reference is made to FIG. 11 for illustrating a non-limiting, exemplary message diagram 110 for a bidirectional service period arrangement. In step 1, MP1 transmits a beacon. The beacon frame comprises set bits in the TIM field for MP2. In step 2, MP2 triggers a service period by using a data frame. The trigger frame triggers bidirectional service periods. In step 3, MP1 indicates to MP2, by setting eosp to "1", that it does not wish to send more frames. MP2 continues the service period by responding with an ACK containing an eosp bit set to "0." In step 4, MP2 and MP1 continue to exchange data and ACK frames until both the data frame and the ACK frame include eosp bits set to "0," at which point the service period is terminated.

II.(b) Active For Duration of the Beacon

In another exemplary embodiment, the beacon MP will stay active until the next beaconing period (i.e., the successive beacon transmission) if it has indicated buffered traffic in a TIM element of the beacon frame. The beacon MP may accept a trigger frame from any MP (i.e., it may not be limited to only the indicated MP, MP2). In some exemplary embodiments, and as described above, a trigger frame substantially immediately initiates a service period. A unidirectional service period, where the beaconing MP transmits data, null or management frames, may end when the succeeding beacon is sent if the TIM element in the succeeding beacon frame does not indicate buffered frames for the same peer MP. If the TIM element contains an indication of buffered traffic, a unidirectional service period may be continued. If bidirectional service periods are used, the service period is ongoing until a data frame and an ACK frame, each containing a set EOSP bit or a set More Data bit (i.e., set to 0), are transmitted, as shown in FIG. 11. This exemplary embodiment may be considered a first-come, first-serve type of system.

In other exemplary embodiments, the service period termination uses the signaling as shown in FIGS. 10 and 11 and termination of the service periods is not dependent on the TIM element of the transmitted beacon(s).

If a MP receives a beacon frame with a TIM element indicating buffered traffic for any MP, the MP knows that the beacon MP will stay at full power until it transmits the next beacon. If the MP detects buffered traffic for itself, or if the MP has traffic to send to the beaconing MP, it may attempt to trigger a service period (i.e., by sending a trigger frame to the beacon MP). The service period triggering may operate as described above with respect to FIGS. 10 and 11.

II.(c) Combination of the Previous Two

In a further exemplary embodiment, the beacon frame may contain at least one bit indicating whether: (a) in response to receiving a trigger frame from the target MP, the beacon MP substantially immediately initiates a service period with only the indicated MP (see section II.(a) above); or (b) the beacon MP stays active until the next beacon transmission and received frames from MPs are considered as trigger frames without regard for which MP transmitted them (see section II.(b) above). As non-limiting examples, the former may be indicated by a bit value of "0" while the later may be indicated by a bit value of "1."

In such a manner, this exemplary embodiment combined the previous two exemplary embodiments by using additional signaling (i.e., at least one bit).

II.(d) Further Discussion Regarding Elimination of the ATIM Period

The exemplary embodiments described above with respect to elimination of the ATIM period provide improved power management, for example, in WLAN mesh networks by enabling a beacon MP to eliminate unused reception time (e.g., the remaining portion of the ATIM period after a triggering frame has been received by the beacon MP). Furthermore, additional signaling may provide increased flexibility since a device (e.g., a beacon MP) can implement different operational modes.

In another non-limiting, exemplary embodiment, and as illustrated in FIG. 12, a method comprises: transmitting, by a first device in a wireless network, a broadcast or multicast message comprising an indication of buffered traffic for a second device in the wireless network (box 121); and in response to receiving a trigger frame from the second device, the first device substantially immediately initiating a service period for communication with the second device (box 122).

A method as above, wherein the trigger frame comprises one of a data frame, a null frame or a management frame. A method as in any above, wherein the communication with the second device comprises a unicast communication using one of unidirectional or bidirectional service periods. A method as in any above, wherein prior to initiating a service period the second device comprises a non-peer mesh point in relation to the first device. A method as in any above, further comprising: in response to receiving the trigger frame, the first device transmitting an acknowledgement to the second device. A method as above, wherein the acknowledgement is transmitted substantially immediately prior to initiation of the service period.

A method as in any above, further comprising: in response to an indication in a succeeding broadcast or multicast message, terminating the service period. A method as above, wherein the indication comprises an absence of at least one set bit. A method as in any above, wherein the indication comprises an absence of at least one set TIM bit. A method as in any above, wherein the indication comprises an absence of at least one sent bit corresponding to the second device.

A method as in any above, further comprising: in response to at least one indication in at least one message transmitted during the service period, terminating the service period. A method as above, wherein the at least one indication comprises at least one of a set EOSP bit and a set More Data bit.

A method as in any above, wherein the first device comprises a mesh point in the wireless network. A method as in any above, wherein the wireless network comprises a wireless local area network. A method as in any above, wherein the wireless network comprises a wireless local area mesh network. A method as in any above, wherein the wireless network comprises an ad hoc wireless local area network. A method as in any above, wherein the broadcast or multicast message comprises a beacon transmission from the first device. A method as in any above, wherein the method is implemented by a computer program executed by the first device. A method as in any above, wherein the method is implemented by an integrated circuit of the first device.

In another non-limiting, exemplary embodiment, a computer program product comprises program instructions embodied on a tangible computer-readable medium. Execution of the program instructions results in operations comprising: transmitting, by a first device in a wireless network, a broadcast or multicast message comprising an indication of buffered traffic for a second device in the wireless network; and in response to receiving a trigger frame from the second device, the first device substantially immediately initiating a service period for communication with the second device.

A computer program product as above, wherein the trigger frame comprises one of a data frame, a null frame or a management frame. A computer program product as in any above, wherein the communication with the second device comprises a unicast communication using one of unidirectional or bidirectional service periods. A computer program product as in any above, wherein prior to initiating a service period the second device comprises a non-peer mesh point in relation to the first device. A computer program product as in any above, execution of the program instructions resulting in operations further comprising: in response to receiving the trigger frame, the first device transmitting an acknowledgement to the second device. A computer program product as above, wherein the acknowledgement is transmitted substantially immediately prior to initiation of the service period.

A computer program product as in any above, execution of the program instructions resulting in operations further comprising: in response to an indication in a succeeding broadcast or multicast message, terminating the service period. A computer program product as above, wherein the indication comprises an absence of at least one set bit. A computer program product as in any above, wherein the indication comprises an absence of at least one set TIM bit. A computer program product as in any above, wherein the indication comprises an absence of at least one sent bit corresponding to the second device.

A computer program product as in any above, execution of the program instructions resulting in operations further comprising: in response to at least one indication in at least one message transmitted during the service period, terminating the service period. A computer program product as above, wherein the at least one indication comprises at least one of a set EOSP bit and a set More Data bit.

A computer program product as in any above, wherein the first device comprises a mesh point in the wireless network. A computer program product as in any above, wherein the wireless network comprises a wireless local area network. A computer program product as in any above, wherein the wireless network comprises a wireless local area mesh network. A computer program product as in any above, wherein the wireless network comprises an ad hoc wireless local area network. A computer program product as in any above, wherein the broadcast or multicast message comprises a beacon transmission from the first device.

In another non-limiting, exemplary embodiment, an apparatus comprises: a transmitter configured to transmit a broadcast or multicast message comprising an indication of buffered traffic for a second device in a wireless network; a receiver; and a controller configured, in response to the receiver receiving a trigger frame from the second device, to substantially immediately initiate a service period for communication with the second device, wherein the apparatus comprises a node in the wireless network.

An apparatus as above, wherein the trigger frame comprises one of a data frame, a null frame or a management frame. An apparatus as in any above, wherein the communication with the second device comprises a unicast communication using one of unidirectional or bidirectional service periods. An apparatus as in any above, wherein prior to initiating a service period the second device comprises a non-peer mesh point in relation to the first device. An apparatus as in any above, wherein the transmitter is further configured, in response to the receiver receiving the trigger frame, to transmit an acknowledgement to the second device. An apparatus as above, wherein the acknowledgement is transmitted substantially immediately prior to initiation of the service period.

An apparatus as in any above, wherein the controller is further configured, in response to an indication in a succeeding broadcast or multicast message, to terminate the service period. An apparatus as above, wherein the indication comprises an absence of at least one set bit. An apparatus as in any above, wherein the indication comprises an absence of at least one set TIM bit. An apparatus as in any above, wherein the indication comprises an absence of at least one sent bit corresponding to the second device.

An apparatus as in any above, wherein the controller is further configured, in response to at least one indication in at least one message transmitted during the service period, to terminate the service period. An apparatus as above, wherein the at least one indication comprises at least one of a set EOSP bit and a set More Data bit.

An apparatus as in any above, wherein the first device comprises a mesh point in the wireless network. An apparatus as in any above, wherein the wireless network comprises a wireless local area network. An apparatus as in any above, wherein the wireless network comprises a wireless local area mesh network. An apparatus as in any above, wherein the wireless network comprises an ad hoc wireless local area network. An apparatus as in any above, wherein the broadcast or multicast message comprises a beacon transmission from the first device. An apparatus as in any above, wherein the controller comprises a processor. An apparatus as in any above, wherein the apparatus comprises one of a cellular phone, a personal digital assistant having wireless communication capabilities, a portable computer having wireless communication capabilities, an image capture device having wireless communication capabilities, a gaming device having wireless communication capabilities, a music storage and playback appliances having wireless communication capabilities or an Internet appliance permitting wireless Internet access.

In another non-limiting, exemplary embodiment, an apparatus comprises: means for transmitting a broadcast or multicast message comprising an indication of buffered traffic for a second device in a wireless network; means for receiving; and means, in response to means for receiving so receiving a trigger frame from the second device, for substantially immediately initiating a service period for communication with the second device, wherein the apparatus comprises a node in the wireless network.

An apparatus as above, wherein the means for transmitting comprises a transmitter, the means for receiving comprises a receiver and the means for initiating comprises a processor.

II.(e) Additional Discussion Regarding Elimination of the ATIM Period

In another non-limiting, exemplary embodiment, and as illustrated in FIG. 13, a method comprises: transmitting, by a first device in a wireless network, a broadcast or multicast message comprising an indication of buffered traffic for a second device in the wireless network, wherein the first device is operable to receive traffic until a successive broadcast or multicast transmission by the first device (box 131); and in response to receiving a trigger frame from another device, the first device initiating a service period for communication with the other device (box 132).

A method as above, wherein the trigger frame comprises one of a data frame, a null frame or a management frame. A method as in any above, wherein the communication with the second device comprises a unicast communication using one of unidirectional or bidirectional service periods. A method as in any above, wherein prior to initiating a service period the second device comprises a non-peer mesh point in relation to the first device. A method as in any above, further comprising: in response to receiving the trigger frame, the first device transmitting an acknowledgement to the second device. A method as above, wherein the acknowledgement is transmitted substantially immediately prior to initiation of the service period. A method as in any above, wherein the service period is initiated by the first device substantially immediately in response to receiving the trigger frame from the other device.

A method as in any above, further comprising: in response to an indication in a succeeding broadcast or multicast message, terminating the service period. A method as above, wherein the indication comprises an absence of at least one set bit. A method as in any above, wherein the indication comprises an absence of at least one set TIM bit. A method as in any above, wherein the indication comprises an absence of at least one sent bit corresponding to the second device.

A method as in any above, further comprising: in response to at least one indication in at least one message transmitted during the service period, terminating the service period. A method as above, wherein the at least one indication comprises at least one of a set EOSP bit and a set More Data bit.

A method as in any above, wherein the first device comprises a mesh point in the wireless network. A method as in any above, wherein the wireless network comprises a wireless local area network. A method as in any above, wherein the wireless network comprises a wireless local area mesh network. A method as in any above, wherein the wireless network comprises an ad hoc wireless local area network. A method as in any above, wherein the broadcast or multicast message comprises a beacon transmission from the first device. A method as in any above, wherein the method is implemented by a computer program executed by the first device. A method as in any above, wherein the method is implemented by an integrated circuit of the first device.

In another non-limiting, exemplary embodiment, a computer program product comprises program instructions embodied on a tangible computer-readable medium. Execution of the program instructions results in operations comprising: transmitting, by a first device in a wireless network, a broadcast or multicast message comprising an indication of buffered traffic for a second device in the wireless network, wherein the first device is operable to receive traffic until a successive broadcast or multicast transmission by the first device; in response to receiving a trigger frame from another device, the first device initiating a service period for communication with the other device.

A computer program product as above, wherein the trigger frame comprises one of a data frame, a null frame or a management frame. A computer program product as in any above, wherein the communication with the second device comprises a unicast communication using one of unidirectional or bidirectional service periods. A computer program product as in any above, wherein prior to initiating a service period the second device comprises a non-peer mesh point in relation to the first device. A computer program product as in any above, execution of the program instructions resulting in operations further comprising: in response to receiving the trigger frame, the first device transmitting an acknowledgement to the second device. A computer program product as above, wherein the acknowledgement is transmitted substantially immediately prior to initiation of the service period. A computer program product as in any above, wherein the service period is initiated by the first device substantially immediately in response to receiving the trigger frame from the other device.

A computer program product as in any above, execution of the program instructions resulting in operations further comprising: in response to an indication in a succeeding broadcast or multicast message, terminating the service period. A computer program product as above, wherein the indication comprises an absence of at least one set bit. A computer program product as in any above, wherein the indication comprises an absence of at least one set TIM bit. A computer program product as in any above, wherein the indication comprises an absence of at least one sent bit corresponding to the second device.

A computer program product as in any above, execution of the program instructions resulting in operations further comprising: in response to at least one indication in at least one message transmitted during the service period, terminating the service period. A computer program product as above, wherein the at least one indication comprises at least one of a set EOSP bit and a set More Data bit.

A computer program product as in any above, wherein the first device comprises a mesh point in the wireless network. A computer program product as in any above, wherein the wireless network comprises a wireless local area network. A computer program product as in any above, wherein the wireless network comprises a wireless local area mesh network. A computer program product as in any above, wherein the wireless network comprises an ad hoc wireless local area network. A computer program product as in any above, wherein the broadcast or multicast message comprises a beacon transmission from the first device.

In another non-limiting, exemplary embodiment, an apparatus comprises: a transmitter configured to transmit a broadcast or multicast message comprising an indication of buffered traffic for a second device in a wireless network; a receiver configured to receive traffic until a successive broadcast or multicast transmission by the transmitter; and a controller configured, in response to the receiver receiving a trigger frame from another device, to initiate a service period for communication with the other device, wherein the apparatus comprises a node in the wireless network.

An apparatus as above, wherein the trigger frame comprises one of a data frame, a null frame or a management frame. An apparatus as in any above, wherein the communication with the second device comprises a unicast communication using one of unidirectional or bidirectional service periods. An apparatus as in any above, wherein prior to initiating a service period the second device comprises a non-peer mesh point in relation to the first device. An apparatus as in any above, wherein the transmitter is further configured, in response to the receiver receiving the trigger frame, to transmit an acknowledgement to the second device. An apparatus as above, wherein the acknowledgement is transmitted substantially immediately prior to initiation of the service period. An apparatus as in any above, wherein the service period is initiated by the controller substantially immediately in response to the receiver receiving the trigger frame from the other device.

An apparatus as in any above, wherein the controller is further configured, in response to an indication in a succeeding broadcast or multicast message, to terminate the service period. An apparatus as above, wherein the indication comprises an absence of at least one set bit. An apparatus as in any above, wherein the indication comprises an absence of at least one set TIM bit. An apparatus as in any above, wherein the indication comprises an absence of at least one sent bit corresponding to the second device.

An apparatus as in any above, wherein the controller is further configured, in response to at least one indication in at least one message transmitted during the service period, to terminate the service period. An apparatus as above, wherein the at least one indication comprises at least one of a set EOSP bit and a set More Data bit.

An apparatus as in any above, wherein the first device comprises a mesh point in the wireless network. An apparatus as in any above, wherein the wireless network comprises a wireless local area network. An apparatus as in any above, wherein the wireless network comprises a wireless local area mesh network. An apparatus as in any above, wherein the wireless network comprises an ad hoc wireless local area network. An apparatus as in any above, wherein the broadcast or multicast message comprises a beacon transmission from the first device. An apparatus as in any above, wherein the controller comprises a processor. An apparatus as in any above, wherein the apparatus comprises one of a cellular phone, a personal digital assistant having wireless communication capabilities, a portable computer having wireless communication capabilities, an image capture device having wireless communication capabilities, a gaming device having wireless communication capabilities, a music storage and playback appliances having wireless communication capabilities or an Internet appliance permitting wireless Internet access.

In another non-limiting, exemplary embodiment, an apparatus comprises: means for transmitting a broadcast or multicast message comprising an indication of buffered traffic for a second device in a wireless network; means for receiving traffic until a successive broadcast or multicast transmission by the transmitter; and means, in response to the means for receiving so receiving a trigger frame from another device, for initiating a service period for communication with the other device, wherein the apparatus comprises a node in the wireless network.

An apparatus as above wherein the means for transmitting comprises a transmitter, the means for receiving comprises a receiver and the means for initiating comprises a processor.

II.(f) Supplementary Discussion Regarding Elimination of the ATIM Period

In another non-limiting, exemplary embodiment, and as illustrated in FIG. 14, a method comprises: transmitting, by a first device in a wireless network, a broadcast or multicast message comprising an indication of buffered traffic for a second device in the wireless network, wherein the broadcast or multicast message further comprises an indication of a current operational mode of a plurality of operational modes for the first device, wherein the plurality of operational modes include a first mode wherein in response to receiving a trigger frame from the second device, the first device substantially immediately initiates a service period with only the second device, wherein the plurality of operational modes include a second mode wherein the first device stays active until a successive broadcast or multicast transmission and a received frame from another device comprises a trigger frame (box 141); and in response to receiving a trigger frame in accordance with the current mode, the first device initiating a service period for communication with another device (box 142).

A method as above, wherein the trigger frame comprises one of a data frame, a null frame or a management frame. A method as in any above, wherein the communication with the second device comprises a unicast communication using one of unidirectional or bidirectional service periods. A method as in any above, wherein prior to initiating a service period the second device comprises a non-peer mesh point in relation to the first device. A method as in any above, further comprising: in response to receiving the trigger frame, the first device transmitting an acknowledgement to the second device. A method as above, wherein the acknowledgement is transmitted substantially immediately prior to initiation of the service period. A method as in any above, wherein the service period is initiated by the first device substantially immediately in response to receiving the trigger frame from the other device.

A method as in any above, further comprising: in response to an indication in a succeeding broadcast or multicast message, terminating the service period. A method as above, wherein the indication comprises an absence of at least one set bit. A method as in any above, wherein the indication comprises an absence of at least one set TIM bit. A method as in any above, wherein the indication comprises an absence of at least one sent bit corresponding to the second device.

A method as in any above, further comprising: in response to at least one indication in at least one message transmitted during the service period, terminating the service period. A method as above, wherein the at least one indication comprises at least one of a set EOSP bit and a set More Data bit.

A method as in any above, wherein the first device comprises a mesh point in the wireless network. A method as in any above, wherein the wireless network comprises a wireless local area network. A method as in any above, wherein the wireless network comprises a wireless local area mesh network. A method as in any above, wherein the wireless network comprises an ad hoc wireless local area network. A method as in any above, wherein the broadcast or multicast message comprises a beacon transmission from the first device. A method as in any above, wherein the method is implemented by a computer program executed by the first device. A method as in any above, wherein the method is implemented by an integrated circuit of the first device.

In another non-limiting, exemplary embodiment, a computer program product comprises program instructions embodied on a tangible computer-readable medium. Execution of the program instructions results in operations comprising: transmitting, by a first device in a wireless network, a broadcast or multicast message comprising an indication of buffered traffic for a second device in the wireless network, wherein the broadcast or multicast message further comprises an indication of a current operational mode of a plurality of operational modes for the first device, wherein the plurality of operational modes include a first mode wherein in response to receiving a trigger frame from the second device, the first device substantially immediately initiates a service period with only the second device, wherein the plurality of operational modes include a second mode wherein the first device stays active until a successive broadcast or multicast transmission and a received frame from another device comprises a trigger frame; and in response to receiving a trigger frame in accordance with the current mode, the first device initiating a service period for communication with another device.

A computer program product as above, wherein the trigger frame comprises one of a data frame, a null frame or a management frame. A computer program product as in any above, wherein the communication with the second device comprises a unicast communication using one of unidirectional or bidirectional service periods. A computer program product as in any above, wherein prior to initiating a service period the second device comprises a non-peer mesh point in relation to the first device. A computer program product as in any above, execution of the program instructions resulting in operations further comprising: in response to receiving the trigger frame, the first device transmitting an acknowledgement to the second device. A computer program product as above, wherein the acknowledgement is transmitted substantially immediately prior to initiation of the service period. A computer program product as in any above, wherein the service period is initiated by the first device substantially immediately in response to receiving the trigger frame from the other device.

A computer program product as in any above, execution of the program instructions resulting in operations further comprising: in response to an indication in a succeeding broadcast or multicast message, terminating the service period. A computer program product as above, wherein the indication comprises an absence of at least one set bit. A computer program product as in any above, wherein the indication comprises an absence of at least one set TIM bit. A computer program product as in any above, wherein the indication comprises an absence of at least one sent bit corresponding to the second device.

A computer program product as in any above, execution of the program instructions resulting in operations further comprising: in response to at least one indication in at least one message transmitted during the service period, terminating the service period. A computer program product as above, wherein the at least one indication comprises at least one of a set EOSP bit and a set More Data bit.

A computer program product as in any above, wherein the first device comprises a mesh point in the wireless network. A computer program product as in any above, wherein the wireless network comprises a wireless local area network. A computer program product as in any above, wherein the wireless network comprises a wireless local area mesh network. A computer program product as in any above, wherein the wireless network comprises an ad hoc wireless local area network. A computer program product as in any above, wherein the broadcast or multicast message comprises a beacon transmission from the first device.

In another non-limiting, exemplary embodiment, a first electronic device comprises: a transmitter configured to transmit a broadcast or multicast message comprising an indication of buffered traffic for a second device in a wireless network, wherein the broadcast or multicast message further comprises an indication of a current operational mode of a plurality of operational modes for the first device, wherein the plurality of operational modes include a first mode wherein in response to receiving a trigger frame from the second device, the first device substantially immediately initiates a service period with only the second device, wherein the plurality of operational modes include a second mode wherein the first device stays active until a successive broadcast or multicast transmission and a received frame from another device comprises a trigger frame; a receiver; and a controller configured, in response to the receiver receiving a trigger frame in accordance with the current mode, to initiate a service period for communication with another device, wherein the first electronic device comprises a node in the wireless network.

A first electronic device as above, wherein the trigger frame comprises one of a data frame, a null frame or a management frame. A first electronic device as in any above, wherein the communication with the second device comprises a unicast communication using one of unidirectional or bidirectional service periods. A first electronic device as in any above, wherein prior to initiating a service period the second device comprises a non-peer mesh point in relation to the first device. A first electronic device as in any above, wherein the transmitter is further configured, in response to the receiver receiving the trigger frame, to transmit an acknowledgement to the second device. A first electronic device as above, wherein the acknowledgement is transmitted substantially immediately prior to initiation of the service period. A first electronic device as in any above, wherein the service period is initiated by the controller substantially immediately in response to the receiver receiving the trigger frame from the other device.

A first electronic device as in any above, wherein the controller is further configured, in response to an indication in a succeeding broadcast or multicast message, to terminate the service period. A first electronic device as above, wherein the indication comprises an absence of at least one set bit. A first electronic device as in any above, wherein the indication comprises an absence of at least one set TIM bit. A first electronic device as in any above, wherein the indication comprises an absence of at least one sent bit corresponding to the second device.

A first electronic device as in any above, wherein the controller is further configured, in response to at least one indication in at least one message transmitted during the service period, to terminate the service period. A first electronic device as above, wherein the at least one indication comprises at least one of a set EOSP bit and a set More Data bit.

A first electronic device as in any above, wherein the first device comprises a mesh point in the wireless network. A first electronic device as in any above, wherein the wireless network comprises a wireless local area network. A first electronic device as in any above, wherein the wireless network comprises a wireless local area mesh network. A first electronic device as in any above, wherein the wireless network comprises an ad hoc wireless local area network. A first electronic device as in any above, wherein the broadcast or multicast message comprises a beacon transmission from the first device. A first electronic device as in any above, wherein the controller comprises a processor. A first electronic device as in any above, wherein the first electronic device comprises one of a cellular phone, a personal digital assistant having wireless communication capabilities, a portable computer having wireless communication capabilities, an image capture device having wireless communication capabilities, a gaming device having wireless communication capabilities, a music storage and playback appliances having wireless communication capabilities or an Internet appliance permitting wireless Internet access.

In another non-limiting, exemplary embodiment, a first electronic device comprises: means for transmitting a broadcast or multicast message comprising an indication of buffered traffic for a second device in a wireless network, wherein the broadcast or multicast message further comprises an indication of a current operational mode of a plurality of operational modes for the first device, wherein the plurality of operational modes include a first mode wherein in response to receiving a trigger frame from the second device, the first device substantially immediately initiates a service period with only the second device, wherein the plurality of operational modes include a second mode wherein the first device stays active until a successive broadcast or multicast transmission and a received frame from another device comprises a trigger frame; means for receiving; and means, in response to the means for receiving so receiving a trigger frame in accordance with the current mode, for initiating a service period for communication with another device, wherein the first electronic device comprises a node in the wireless network.

A first electronic device as above, wherein the means for transmitting comprises a transmitter, the means for receiving comprises a receiver and the means for initiating comprises a processor.

III. Further Considerations

While the exemplary embodiments have been described above particularly in the context of the WLAN mesh networks (802.11s), it should be appreciated that the exemplary embodiments of this invention are not limited for use with only this one particular type of wireless communication system, and that they may be used to advantage in other wireless communication systems, such as other IEEE 802.11 standards or pending amendments (e.g., the 802.11n amendment for MIMO communication) and the IEEE 802.16 (WiMAX) standard, as non-limiting examples.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

We claim:

1. A method comprising:
    determining that a device in a wireless network is concurrently operating in a first power management mode on a peer-specific link and in a second power management mode, different from the first power management mode, on another link, wherein during the concurrent operation, the device is able to transmit at least a first beacon in the first power management mode on the peer-specific link and to transmit at least a second beacon in the second power management mode on the other link; and
    transmitting a message to another device over the peer-specific link, comprising an indication that the device is using the first power management mode on the peer-specific link.

2. The method of claim 1, wherein the first power management mode is one of a full power mode in which the device is always awake, and a power saving mode.

3. The method of claim 2, wherein the power saving mode is one of a plurality of power saving modes.

4. The method of claim 3, wherein the power saving mode is one of:
    a light sleep mode in which the device is awake during times needed to send its own beacon and to receive beacons from the peer and may sleep at other times; and
    a deep sleep mode in which the device is awake when needed to transmit its beacon to the peer and need not be awake to receive beacons from the peer.

5. The method of claim 4, wherein the message comprises a power management level bit and a power management bit and the power management level bit and the power management bit are set according to:

| Power Management Mode | Power Management Bit | Power Management Level Bit |
|---|---|---|
| Full Power | 0 | 0 |
| Light Sleep | 1 | 0 |
| Deep Sleep | 1 | 1. |

6. The method of claim 5, wherein the message bearing the power management level bit and the power management bit is sent in a unicast frame, and is sent to the peer in all unicast frames to that peer.

7. The method of claim 4, wherein the power saving mode comprises the light sleep mode, the method further comprising, prior to determining that the device is using a power saving mode:
    sending an indication in a beacon frame that the device has buffered traffic for the peer; and
    receiving a trigger from the peer prior to entering the light sleep mode on the peer specific link.

8. The method of claim 4, wherein the power saving mode comprises the light sleep mode, the method further comprising:
    receiving a beacon from the peer indicating that the peer has buffered traffic for the device, and
    sending a trigger frame outside an awake window of the device prior to the device entering the light sleep mode.

9. The method of claim 3, further comprising setting a non-peer power state to indicate that the device is using one of the plurality of power saving modes for non-peer links; and transmitting a beacon with an indication of the non-peer power state.

10. The method of claim 9, wherein the non-peer power state is a base power management mode that is selected from among the plurality of power saving modes and an additional full power mode in which the device is always awake, wherein the base power management mode is constrained to be no more saving of power in the device than the specific power management mode on the peer-specific link.

11. The method of claim 3, wherein the device has a plurality of concurrent communication links with a plurality of other peers, wherein the device uses at least two different power saving modes concurrently for at least two different links of the plurality of concurrent communication links.

12. The method of claim 1, wherein the wireless network comprises a wireless local area network.

13. The method of claim 12, wherein the device comprises a mesh point in the wireless network.

14. The method of claim 13, wherein the wireless network comprises a wireless local area mesh network.

15. The method of claim 13, wherein the method is executed by at least one of the device and an integrated circuit configured to be disposed in a mesh point of a wireless local area network.

16. An apparatus comprising:
at least one processor;
memory storing a program of instructions;
wherein the memory storing the program of instructions is configured to, with the at least one processor, cause the apparatus to at least:
determine that a device in a wireless network is concurrently operating in a first power management mode on a peer-specific link and in a second power management mode, different from the first power management mode, on another link, wherein during the concurrent operation, the device is able to transmit at least a first beacon in the first power management mode on the peer-specific link and to transmit at least a second beacon in the second power management mode on the other link; and
transmit a message to another device over the peer-specific link, comprising an indication that the device is using the first power management mode on the peer-specific link.

17. The apparatus of claim 16, wherein the first power management mode is one of a full power mode in which the device is always awake, and a power saving mode.

18. The apparatus of claim 17, wherein the power saving mode is a power saving mode of a plurality of power saving modes.

19. The apparatus of claim 16, wherein the power saving mode is one of:
a light sleep mode in which the device is awake during times needed to send its own beacon and to receive beacons from the peer and may sleep at other times; and
a deep sleep mode in which the device is awake when needed to transmit its beacon to the peer and need not be awake to receive beacons from the peer.

20. The apparatus of claim 19, wherein the message comprises a power management level bit and a power management bit and the power management level bit and the power management bit are set according to:

| Power Management Mode | Power Management Bit | Power Management Level Bit |
| --- | --- | --- |
| Full Power | 0 | 0 |
| Light Sleep | 1 | 0 |
| Deep Sleep | 1 | 1. |

21. The apparatus of claim 20, wherein the transmitter is further configured to send the message bearing the power management bit and the power management level bit to the peer in all unicast frames to that peer.

22. The apparatus of claim 20, wherein:
the apparatus is further caused to set a non-peer power state to indicate that the device is using one of the plurality of power saving modes for non-peer links; and
the transmitter is further configured to transmit a beacon with an indication of the non-peer power state.

23. The apparatus of claim 22, wherein the non-peer power state is a base power management mode that is selected from among the plurality of power saving modes and an additional full power mode in which the device is always awake, wherein the base power management mode is constrained to be no more saving of power in the mesh point than the specific power management mode on the peer-specific link.

24. The apparatus of claim 19, wherein the device has a plurality of concurrent communication links with a plurality of other peers, wherein the processor is configured to use at least two different power saving modes concurrently for at least two different links of the plurality of concurrent communication links.

25. The apparatus of claim 19 further comprising a receiver and wherein the power saving mode comprises the light sleep mode;
the transmitter further configured to send, prior to determining that the device is using a power saving mode, an indication in a beacon frame that the mesh point has buffered traffic for the peer;
the processor is configured to place the device into the light sleep mode on the peer specific link after the receiver receives a trigger from the peer.

26. The apparatus of claim 19, wherein:
the power saving mode comprises the light sleep mode;
the apparatus further comprising a receiver configured to receive a beacon from the peer indicating that the peer has buffered traffic for the device, and
the transmitter further configured to send a trigger frame outside an awake window of the device prior to when the processor places the mesh point into the light sleep mode on the peer specific link.

27. The apparatus of claim 16, wherein the wireless network comprises a wireless local area network.

28. The apparatus of claim 16, wherein the device comprises a mesh point in the wireless network.

29. An apparatus comprising:
at least one processor;
memory storing a program of instructions;
wherein the memory storing the program of instructions is configured to, with the at least one processor, cause the apparatus to at least:
determine that a mesh point in a wireless network is concurrently operating in a first power management mode on a peer-specific link and in a second power management mode, different from the first power management mode, on another link, wherein, wherein during the concurrent operation, the device is able to transmit at least a first beacon in the first power management mode on the peer-specific link and to transmit at least a second beacon in the second power management mode on the other link; and control a transmitter to transmit a message to another device over the peer-specific link, comprising an indication that the mesh point is using the first power management mode on the peer-specific link.

30. The apparatus of claim 29, wherein the first power management mode is one of a full power mode in which the mesh point is always awake, and a power saving mode.

31. The apparatus of claim 29, wherein the power saving mode is a power saving mode of a plurality of power saving modes comprising:
a light sleep mode in which the mesh point is awake during times needed to send its own beacon and to receive beacons from the peer and may sleep at other times; and
a deep sleep mode in which the mesh point is awake when needed to transmit its beacon to the peer and need not be awake to receive beacons from the peer.

32. The apparatus of claim 31, wherein the message comprises a power management level bit and a power management bit and the power management level bit and the power management bit are set according to:

| Power Management Mode | Power Management Bit | Power Management Level Bit |
| --- | --- | --- |
| Full Power | 0 | 0 |
| Light Sleep | 1 | 0 |
| Deep Sleep | 1 | 1. |

33. The apparatus of claim 31, wherein the apparatus is further caused to set a non-peer power state to indicate that the mesh point is using one of the plurality of power saving modes for non-peer links; and the transmitter is further configured to transmit a beacon with an indication of the non-peer power state.

34. The apparatus of claim 31, wherein the mesh point has a plurality of concurrent communication links with a plurality of other peers, and wherein the apparatus is caused to use at least two different power saving modes concurrently for at least two different links of the plurality of concurrent communication links.

35. A non-transitory computer readable memory storing a program of instructions, execution of which by at least one processor, configures an apparatus to perform actions comprising at least:
determining that a mesh point in a wireless network is concurrently operating in a first power management mode on a peer-specific link and in a second power management mode, different from the first power management mode, on another link, wherein during the concurrent operation, the device is able to transmit at least a first beacon in the first power management mode on the peer-specific link and to transmit at least a second beacon in the second power management mode on the other link; and configuring a transmitter to transmit a message to another device over the link, comprising an indication that the device is using the first power management mode on the peer-specific link.

36. The computer readable memory of claim 35, wherein the first power management mode is one of a full power mode in which the mesh point is always awake, and a power saving mode.

37. The computer readable memory of claim 35, wherein the power saving mode is one of a plurality of power saving modes comprising:
a light sleep mode in which the mesh point is awake during times needed to send its own beacon and to receive beacons from the peer and may sleep at other times; and
a deep sleep mode in which the mesh point is awake when needed to transmit its beacon to the peer and need not be awake to receive beacons from the peer.

38. The computer readable memory of claim 37, wherein the message comprises a power management level bit and a power management bit and the power management level bit and the power management bit are set according to:

| Power Management Mode | Power Management Bit | Power Management Level Bit |
| --- | --- | --- |
| Full Power | 0 | 0 |
| Light Sleep | 1 | 0 |
| Deep Sleep | 1 | 1. |

39. The computer readable memory of claim 37, the actions further comprising:
setting a non-peer power state to indicate that the mesh point is using one of the plurality of power saving modes for non-peer links; and
configuring the transmitter to send a beacon with an indication of the non-peer power state.

40. The computer readable memory of claim 37, wherein the mesh point has a plurality of concurrent communication links with a plurality of other devices, the actions further comprising:
using at least two different power saving modes concurrently for at least two different links of the plurality of concurrent communication links.

41. An apparatus comprising:
processing means for determining that a mesh point in a wireless network is concurrently operating in a first power management mode on a peer-specific link and in a second power management mode on another link, wherein during the concurrent operation, the device is able to transmit at least a first beacon in the first power management mode on the peer-specific link and to transmit at least a second beacon in the second power management mode on the other link; and
transmitting means for transmitting a message to another device over the peer-specific-link, comprising an indication that the device is using the first power management mode on the peer-specific link.

* * * * *